United States Patent
Cyran et al.

(10) Patent No.: US 7,337,433 B2
(45) Date of Patent: Feb. 26, 2008

(54) SYSTEM AND METHOD FOR POWER PROFILING OF TASKS

(75) Inventors: Robert J. Cyran, Delmont, PA (US); Edward A. Anderson, Gibsonia, PA (US); Scott P. Gary, Santa Barbara, CA (US); Scott M. Smith, Pittsburgh, PA (US); Vijaya B. P. Sarathy, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 850 days.

(21) Appl. No.: 10/326,436

(22) Filed: Dec. 19, 2002

(65) Prior Publication Data

US 2003/0191791 A1    Oct. 9, 2003

Related U.S. Application Data

(60) Provisional application No. 60/401,128, filed on Aug. 5, 2002, provisional application No. 60/369,596, filed on Apr. 4, 2002.

(51) Int. Cl.
*G06F 9/44* (2006.01)
*G06F 1/00* (2006.01)
*G01R 21/00* (2006.01)
*G01R 19/18* (2006.01)

(52) U.S. Cl. .................. 717/130; 702/60; 713/340; 324/120

(58) Field of Classification Search ......... 717/100–167
See application file for complete search history.

(56) References Cited

U.S. PATENT DOCUMENTS

| | | | | |
|---|---|---|---|---|
| 5,557,557 | A * | 9/1996 | Frantz et al. | 703/22 |
| 6,014,021 | A * | 1/2000 | Le Van Suu | 324/142 |
| 6,272,672 | B1 * | 8/2001 | Conway | 717/107 |
| 6,566,895 | B2 * | 5/2003 | Estrela et al. | 324/726 |
| 2003/0056200 | A1 * | 3/2003 | Li et al. | 717/128 |
| 2003/0191976 | A1 * | 10/2003 | Cyran et al. | 713/340 |
| 2003/0200473 | A1 * | 10/2003 | Fung | 713/320 |

FOREIGN PATENT DOCUMENTS

DE        3708441 C1 *    8/1988

OTHER PUBLICATIONS

Kathleen Baynes et al., "The Performance and Energy Consumption of Three Embedded Real-Time Operating Systems", Nov. 2001, Proceedings of the 2001 international conference on Compilers, architecture, and synthesis for embedded systems, ACM, pp. 203-210.*

(Continued)

*Primary Examiner*—Wei Zhen
*Assistant Examiner*—Chih-Ching Chow
(74) *Attorney, Agent, or Firm*—Robert D. Marshall, Jr.; W. James Brady; Frederick J. Telecky, Jr.

(57) ABSTRACT

Systems and methods for improved power profiling of embedded applications are presented. These inventions provide the ability to measure the power consumption of an embedded application at the task level as the application is executing on the target hardware. Methods and apparatus are provided to permit such measurements in both real-time and non-real-time.

4 Claims, 22 Drawing Sheets

OTHER PUBLICATIONS

Dejan Raskovic, et. al.; *Energy Profiling of DSP Applications, A Case Study of an Intelligent ECG Monitor*, Univ. of Alabama and Texas Instruments Incorporated.

Ed Anderson, et. al.; *Target System Power Profiling via Code Composer Studio*, Application Report, Jan. 2002, pp. 1-40, SPRA074 Texas Instruments.

Clay Turner, *Calculation of TMS320LC54X Power Dissipation*, Texas Instruments Incorporated, Application Report, Jun. 1997, pp. iii-B-4, SPRA 164, Texas Instruments Incorporated.

Mike Tien-Chien Lee, et. al.; *Power Analysis and Minimization Technique for Embedded DSP Software*, pp. 1-31, Fujitsu Labs of America Inc., and Princeton University, Mar. 1997.

Vivek Tiwari, et.al.; *Instruction Level Power Analysis and Optimization of Software*, Journal of VLSI Signal Processing, 1996, pp. 1-18, Princeton University and Fujitsu Labs of America Inc.

Jeff Russell: *Assembly Code Power Analysis of High Performance Embedded Processor Family*, Univ. Texas at Austin. May 1, 1998, 23 pgs.

Application Program Interface , *TSK Module*, pp. 2-309-2-343.

Dejan Raskovic, et. al.; Energy Profiling of DSP Applications, A Case Study of an Intelligent ECG Monitor, in Proc. of DSPS Fest 2000, Westin Galleria Hotel, Houston, TX, Aug. 2-4, 2000.

TMS320c6000 DSP/BIOS Application Programming Interface (API) Reference Guide, pp. 2-309-2-343. Dec. 2001.

* cited by examiner

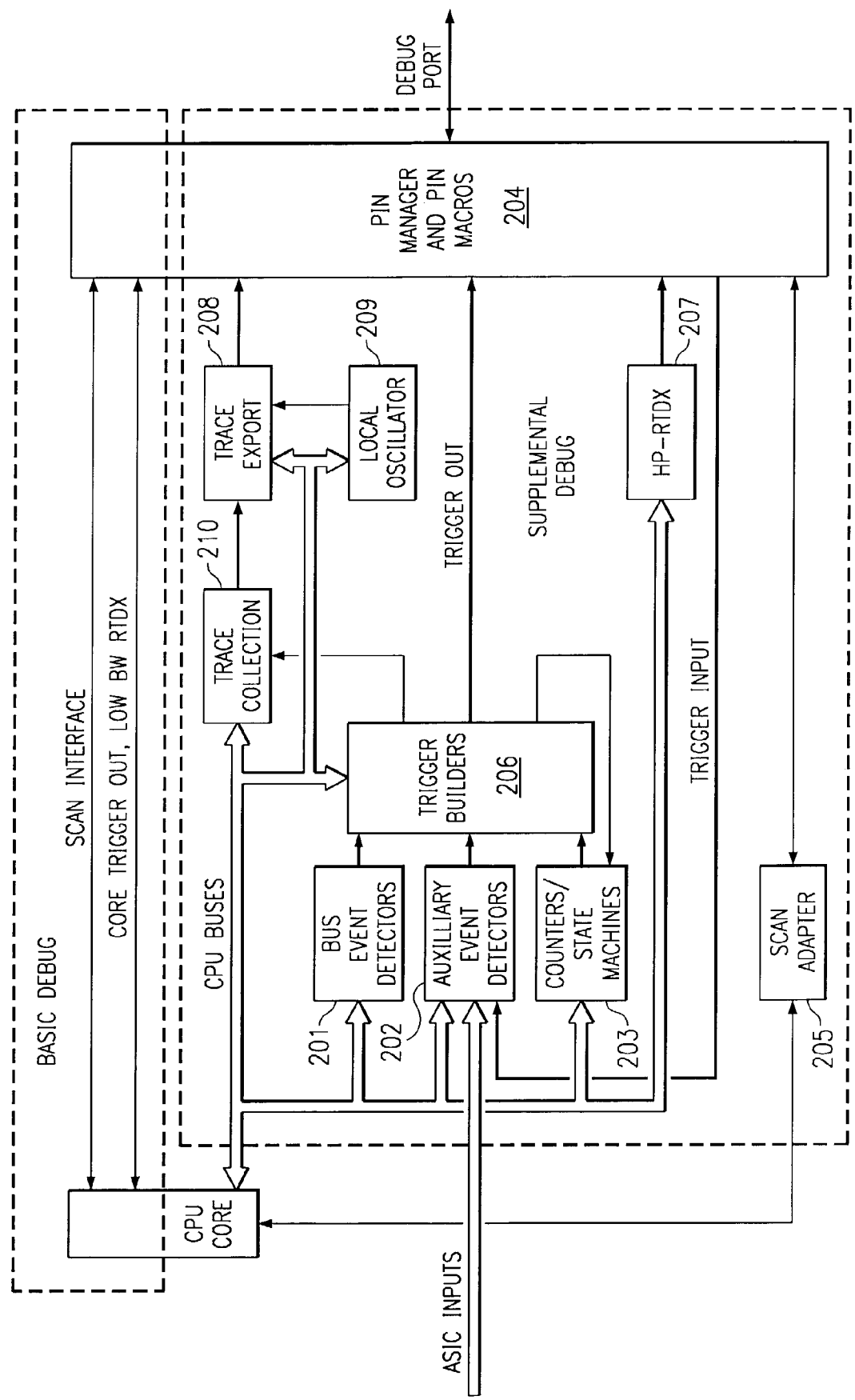

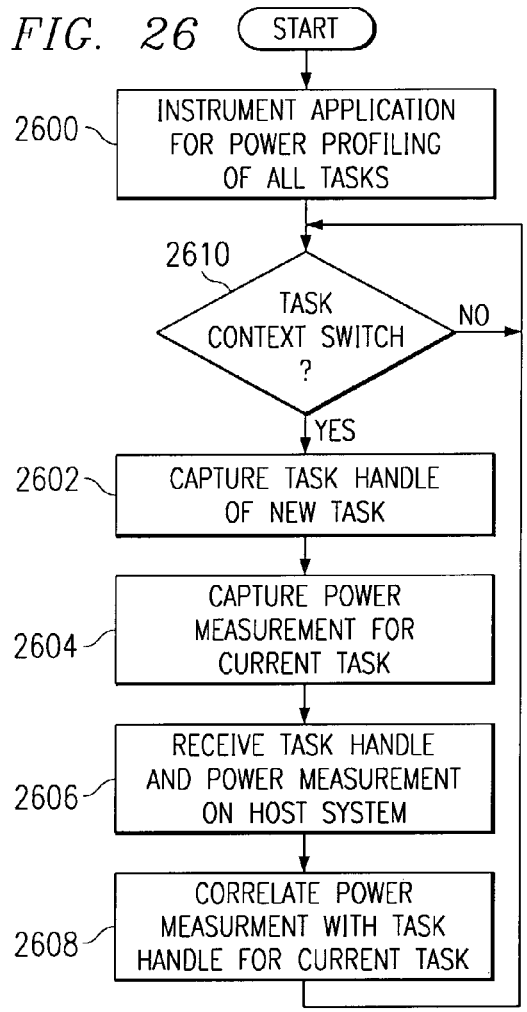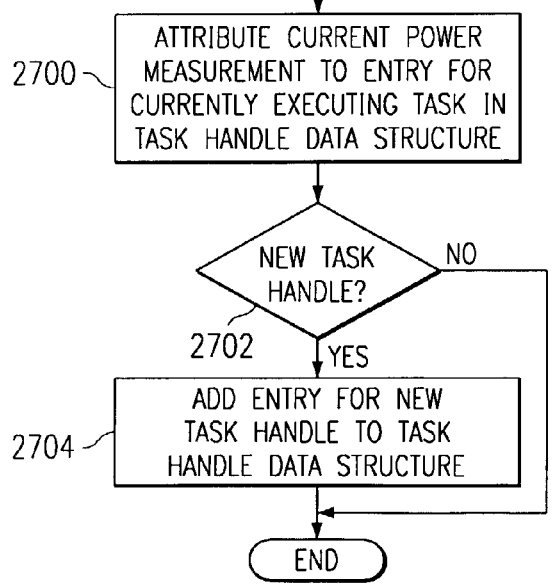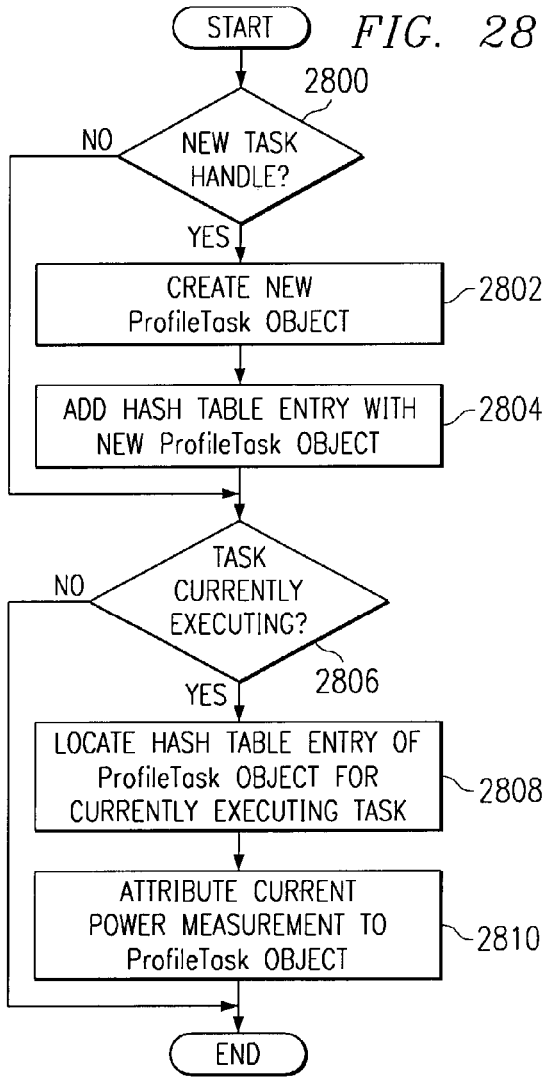

SYSTEM AND METHOD FOR POWER PROFILING OF TASKS

This application is related to and claims priority under 35 USC §119 (e)(1) to Provisional Application Ser. No. 60/369,596, "Power Profiler" filed on Apr. 4, 2002 and Provisional Application Ser. No. 60/401,128, "Power Profiler" filed on Aug. 5, 2002. This application is also related to co-pending applications Ser. No. 10/325,024 "Power Profiling System and Method for Correlating Runtime Information" and Ser. No. 10/324,269 "Method And Apparatus for Non-Obtrusive Power Profiling."

FIELD OF THE INVENTION

This invention generally relates to microprocessors, and more specifically to improvements in profiling the power consumption of a microprocessor application.

BACKGROUND OF THE INVENTION

Power is a critical constraint in the design of embedded applications. For example, in the world of portable electronics, one of the key concerns for consumers is the time they can operate their devices on battery power. Therefore, a top priority in the portable electronics industry is designing low power devices. To support this endeavor, various techniques for measuring the power consumption of these applications have been developed. Many of these techniques focus solely on the hardware components of the application and ignore the impact of the software components on the overall power consumption.

Software impacts power consumption at various design levels. At the highest level, the partitioning of application functionality between hardware and software has implications on total power consumption. The choice of algorithm and other higher-level design decisions for the software components also affect system power consumption. The choice of programming language constructs in implementing the design also affects the power cost of the software.

Some techniques, with varying levels of effectiveness, have been developed to analyze power consumption from the software perspective. For example, some estimation techniques are based on architectural level analysis of the processor. Power costs are assigned to architectural components such as datapath execution units, control units, and memory elements. Then, the power cost of a hardware module is determined by the estimated average capacitance that would switch when the module is activated based on a statistical power model. Activity factors for the modules are obtained from functional simulation over typical input streams. Power costs are assigned to individual modules, in isolation from one another, ignoring the correlations between the activities of different modules during execution of real programs.

In another technique, power analysis is done at the instruction level. In this type of analysis, power models of programs are created from a set of base costs for the instructions in the processor instruction set and the power costs of inter-instruction effects such as stalls and cache misses. These models require the generation of the base instruction costs and the inter-instruction effects on a processor-by-processor basis and their accuracy is limited by the accuracy in determining the impact of the dynamic behavior of an application.

In addition to these model-based techniques, some methods for measuring power consumption during actual execution of the embedded application at varying levels of granularity have been developed. In one method, the power consumption of a selected single range of instructions can be measured. In another, the power consumption of selected functions can be measured but the application is halted after each function is executed.

SUMMARY OF THE INVENTION

The present invention seeks to provide methods and systems for measuring the power consumption of tasks of an embedded application in either real-time or non-real-time. In a method for measuring power consumption of tasks in real-time, the embedded application is instrumented to capture task execution data. As each task is executed on a target system, task execution data is generated and power measurement data is captured. The task execution data is received on a host system as it is being generated without halting the execution of the embedded application. The task execution data is correlated with the power measurement data to determine the power consumption of each executed task.

In a refinement of the above method, the task execution data is comprised of a set of task handles for all executed tasks. These task handles are taken in the execution order of the tasks. In a further refinement, the power measurement data is comprised of a set of power measurements where each power measurement corresponds to the execution period of an executed task. These power measurements are arranged in the order they are captured. With these refinements, the correlation step comprises processing each task handle in turn of the set of task handles to determine the identity of its associated task and attributing the next power measurement in the set of power measurements to that task.

In an alternate version of this method, the step of instrumenting the application comprises causing a trigger function to be called at each task context switch by replacing a task switch hook function address with the address of the trigger function. This trigger function may execute a method for collecting the task handles of the executed tasks and the power measurements associated with the task executions. This method comprises transmitting a task handle of a task about to be executed to the host system, signaling the power measurement device to stop measuring power and capture a power measurement, and signaling the power measurement device to start measuring power.

In a further refinement, the generation of task execution data in the method above comprises generating such data when a task is created or when it is executed. This permits the capture of power measurement data for both statically and dynamically created tasks. Instrumenting the application may then comprise replacing the task switch hook function with a trigger function so that the trigger function is called at each task context switch and replacing the task create hook function with a task creation support function so that the latter will be called when each task is created. Execution data may then comprise task handles taken in both the execution order and the creation order of the application tasks. The power measurement data may comprise a set of power measurements corresponding to the execution periods of the application tasks. The step of correlating may then comprise taking different actions if a task handle in the execution data is a task creation handle or a task execution handle. If the task handle under consideration is a task creation handle, a ProfileTask object is created for the associated task and appropriately stored in an array and a hashtable used to manage the correlation process. If the task handle is a task execution handle, a ProfileTask object already exists for the associated task. The correct ProfileTask object is located and the next power measurement in the set of power measurements is attributed to the associated task.

In a method for measuring power consumption of tasks in non-real-time, the embedded application is instrumented to capture task execution data. As each task is executed on a target system, task execution data is generated and power measurement data is captured. The task execution data is received on a host system as it is being generated. The task execution data is correlated with the power measurement data to determine the power consumption of each executed task.

In a refinement of the above method, the task execution data is comprised of a set of task handles for all executed tasks. These task handles are taken in the execution order of the tasks. In a further refinement, the power measurement data is comprised of a set of power measurements where each power measurement corresponds to the execution period of an executed task. These power measurements are arranged in the order they are captured. With these refinements, the correlation step comprises processing each task handle in turn of the set of task handles to determine the identity of its associated task and attributing the next power measurement in the set of power measurements to that task.

In an alternate version of the method, the step of instrumenting the application comprises causing a trigger function to be called at each task context switch by replacing a task switch hook function address with the address of the trigger function. This trigger function may execute a method for collecting the task handles of the executed tasks and the power measurements associated with the task executions. This method comprises transmitting a task handle of a task about to be executed to the host system, signaling the power measurement device to stop measuring power and capture a power measurement, and signaling the power measurement device to start measuring power.

In a further refinement, the generation of task execution data in the first method above comprises generating such data when a task is created or when it is executed. This permits the capture of power measurement data for both statically and dynamically created tasks. Instrumenting the application may then comprise replacing the task switch hook function with a trigger function so that the trigger function is called at each task context switch and replacing the task create hook function with a task creation support function so that the latter will be called when each task is created. Execution data may then comprise task handles taken in both the execution order and the creation order of the application tasks. The power measurement data may comprise a set of power measurements corresponding to the execution periods of the application tasks. The step of correlating may then comprise taking different actions if a task handle in the execution data is a task creation handle or a task execution handle. If the task handle under consideration is a task creation handle, a ProfileTask object is created for the associated task and appropriately stored in an array and a hashtable used to manage the correlation process. If the task handle is a task execution handle, a ProfileTask object already exists for the associated task. The correct ProfileTask object is located and the next power measurement in the set of power measurements is attributed to the associated task.

BRIEF DESCRIPTION OF THE DRAWINGS

Particular embodiments in accordance with the invention will now be described, by way of example only, and with reference to the accompanying drawings in which:

FIG. 2 is a block diagram of emulation support circuitry;

FIGS. 7-14B illustrate various displays of an embodiment of a power profiling system;

FIGS. 15-17, 19, 21-24, and 26-30 are flowgraphs of various methods of power profiling;

Corresponding numerals and symbols in the different figures and tables refer to corresponding parts unless otherwise indicated.

DETAILED DESCRIPTION OF EMBODIMENTS OF THE INVENTION

Systems and methods for improved power profiling of embedded applications are described below. These inventions provide the ability to measure the power consumption of an embedded application at varying levels of software granularity as the application is executing on the target hardware. Methods and apparatus are provided to permit such measurements in both real-time and non-real-time.

The embodiments of the systems and methods presented below are exemplary and are presented in relation to target hardware incorporating digital signal processing technology and advanced emulation technology. Details of the general construction of such digital systems are well known and may be found readily elsewhere. For example, U.S. Pat. No. 5,072,418 issued to Frederick Boutaud, et al, describes a digital signal processor (DSP) in detail. U.S. Pat. No. 5,329,471 issued to Gary Swoboda, et al, describes in detail how to test and emulate a DSP. Other embodiments using differing processor and/or emulation technology should be apparent to one skilled in the art.

Figure 1A:
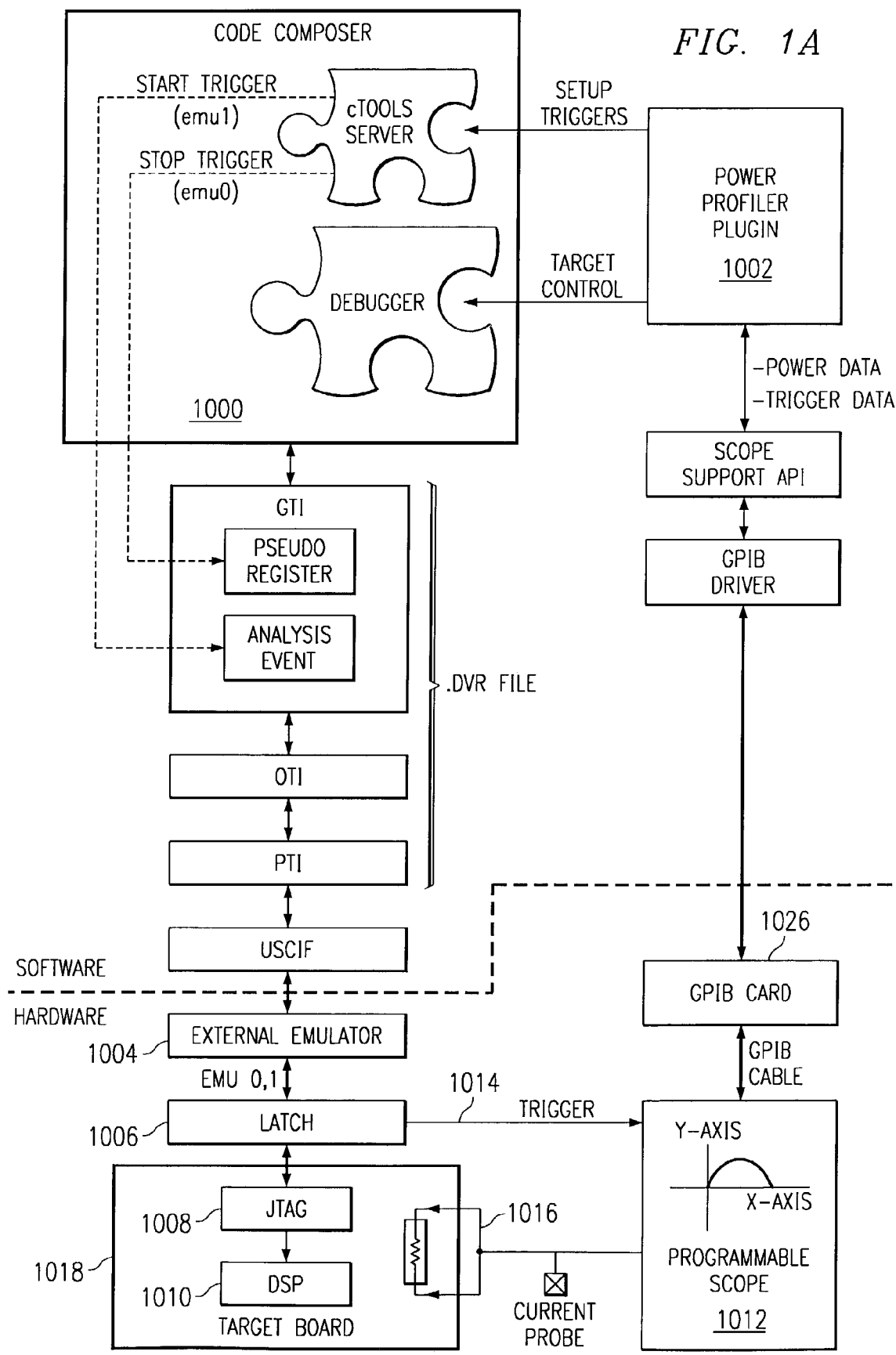
FIGS. 1A-1C are block diagrams of systems for power profiling of embedded applications.
Figure 1B:
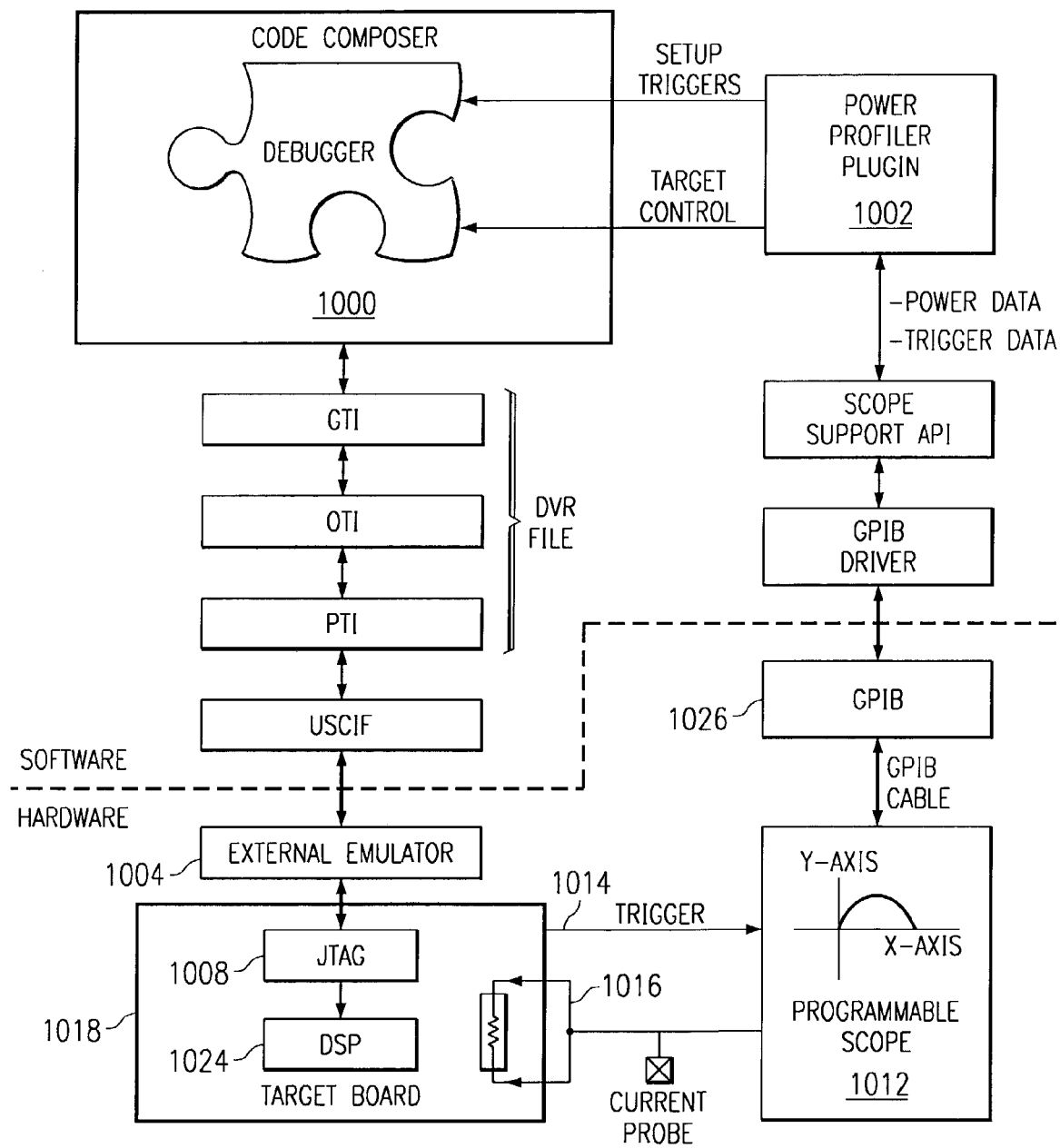
Figure 1C:
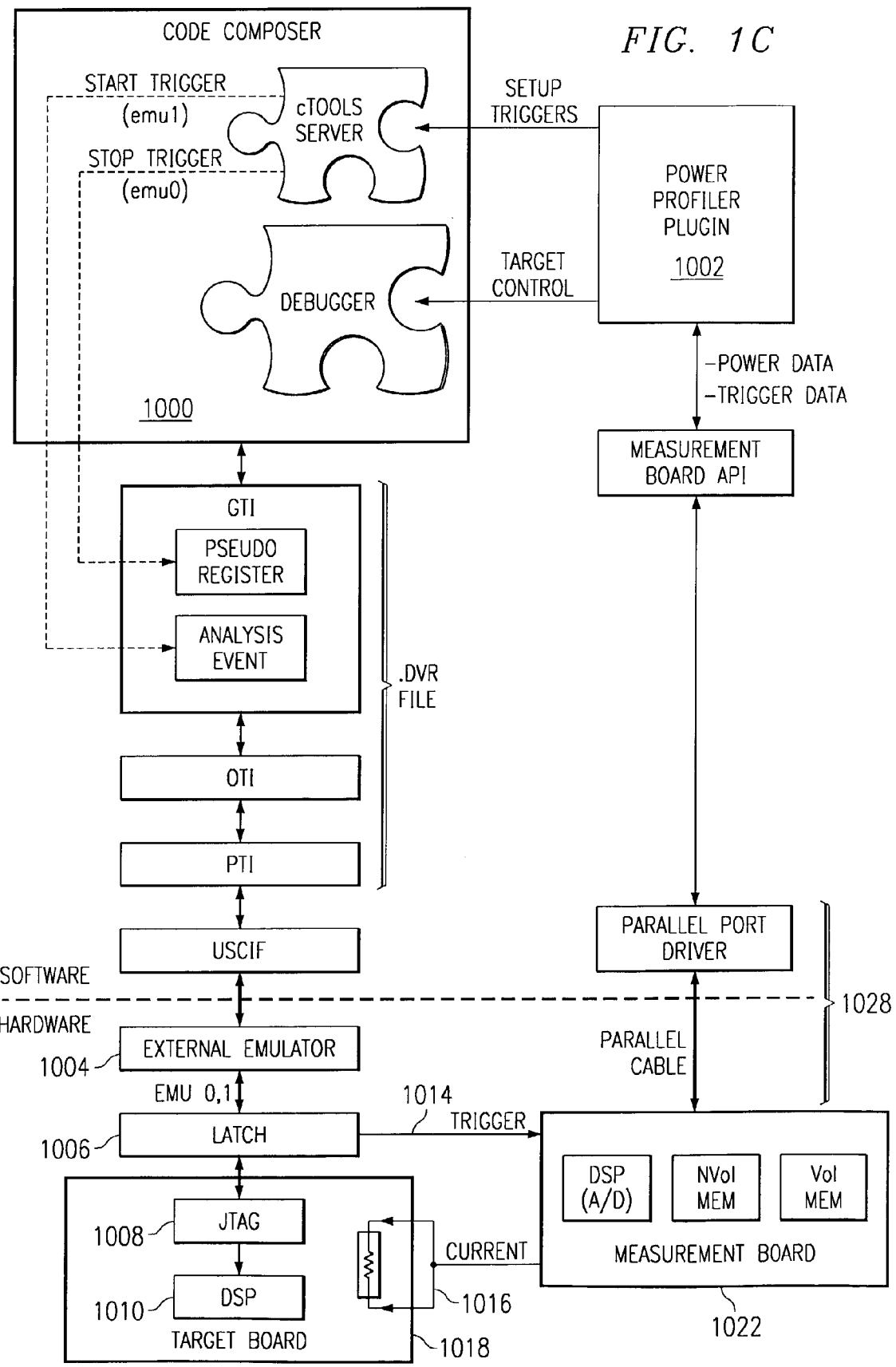

FIGS. 1A-1C present various embodiments of a system for power profiling of an embedded application. Each system comprises host computer 1000 connected to target system 1018 through emulation controller 1004. Host computer 1000 provides an integrated software development environment including debug software, a compiler, and software for sending and receiving information between the software development environment and target system 1018 through emulator 1004. Typically, emulation controller 1004 is connected to target system 1018 through a JTAG (IEEE 1149.1) test access port 1008. The integrated software development environment also comprises power profiling software 1002.

In FIGS. 1A and 1C, target system 1018 is comprised of at least one digital signal processor (DSP) 1010. DSP 1010 comprises emulation circuitry providing a standard JTAG debug interface with two additional terminals or pins (interchangeably referred to as nET1 and nET2 or EMU0 and EMU1) supporting various extended debugging capabilities. Such emulation circuitry is well known in the art and is described in detail in U.S. Pat. No. 5,828,824 issued to Gary Swoboda. These terminals may be used to export trigger signals from DSP 1010 without interfering with any other functionality of the standard JTAG debug interface. These terminals are made available for triggering a power measurement device by latch 1006 residing between JTAG port 1008 and emulation controller 1004.

The emulation circuitry of DSP 1010 further comprises emulation components that may be programmed to generate the trigger signals. FIG. 2 presents one possible configuration of emulation components. These emulation components comprise logic that monitors activity such as event detector 201 and auxiliary event detector 202, logic that records activity such as counters and state machines (block 203), logic that permits pin sharing such as scan adapter 205 and pin manager 204, logic that imports data such as RTDX 207, logic that accelerates transmission such as local oscillator 209, logic that exports data such as RTDX 207 and trace export 208, logic that captures execution activity such as trace collection 210, and logic that directs traffic such as trigger builder 206.

In FIG. 1B, target system 1018 is comprised of at least one digital signal processor (DSP) 1024. Circuitry connected to an I/O pin of DSP 1024 is provided to permit the use of the pin for transmitting trigger signals to a power measurement device.

Various types of power measurement devices, e.g. oscilloscopes, multimeters, special purpose boards, etc., and means for connecting the devices to the system may be employed. In FIG. 1A, the power measurement device is oscilloscope 1012. Oscilloscope 1012 is connected by current probe 1016 to a power measurement point on target system 1018. It receives signals to start and stop power measurements via trigger 1014 connected to EMU0 and EMU1 on target system 1018 via latch 1006. Oscilloscope 1012 is also connected to host computer 1000 via General Purpose Interface Board (GPIB) 1026 to permit collection of power measurement data. In FIG. 1B, the power measurement device is again oscilloscope 1012 but here trigger 1014 is connected to a pin of DSP 1024. The DSP pin may be an XF pin, any general purpose I/O (GPIO) pin or any user configurable pin that can be controlled through software. The connection to host computer 1000 is also GPIB 1026. In FIG. 1C, the power measurement device is special purpose power measurement board 1022 with the capability to capture, amplify, convert, and store power data. Measurement board 1022 is connected by current probe 1016 to a power measurement point on target system 1018. It receives signals to start and stop power measurements via trigger 1014 connected to EMU0 and EMU1 on target system 1018 via latch 1006. Measurement board 1022 is connected to host computer 1000 via parallel port interface 1028 to permit collection of power measurement data. Alternatively, measurement board 1022 may also be connected to host computer 1000 with a USB connection.

Figure 3:
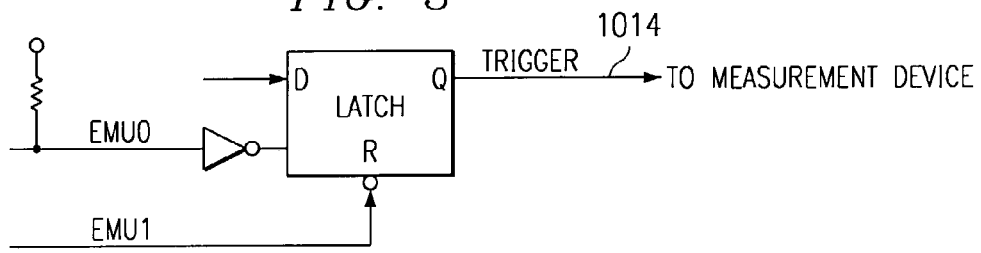
FIG. 3 is an embodiment of a trigger latch.

FIG. 3 illustrates an embodiment of latch 1006. When the emulation circuitry of DSP 1010 is programmed to generate trigger signals for power measurement, a pulse on EMU0 will cause trigger 1014 to latch and send a start indication to the connected power measurement device. A pulse on EMU1 will clear trigger 1014 telling the connected power measurement device to terminate power data collection.

Figure 4:
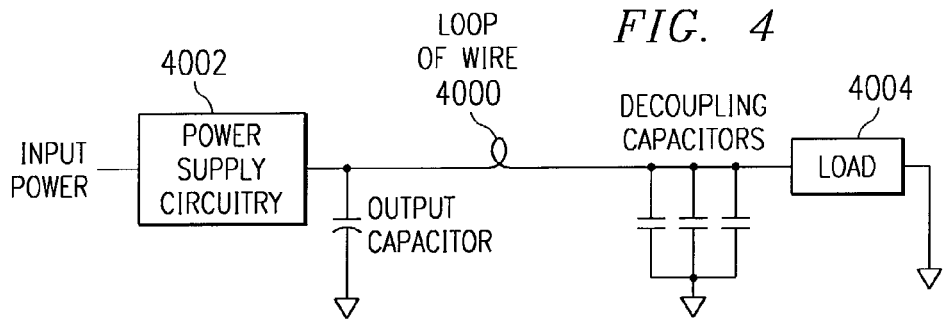
FIG. 4 illustrates modifications to a target system to support power profiling.
Figure 5:
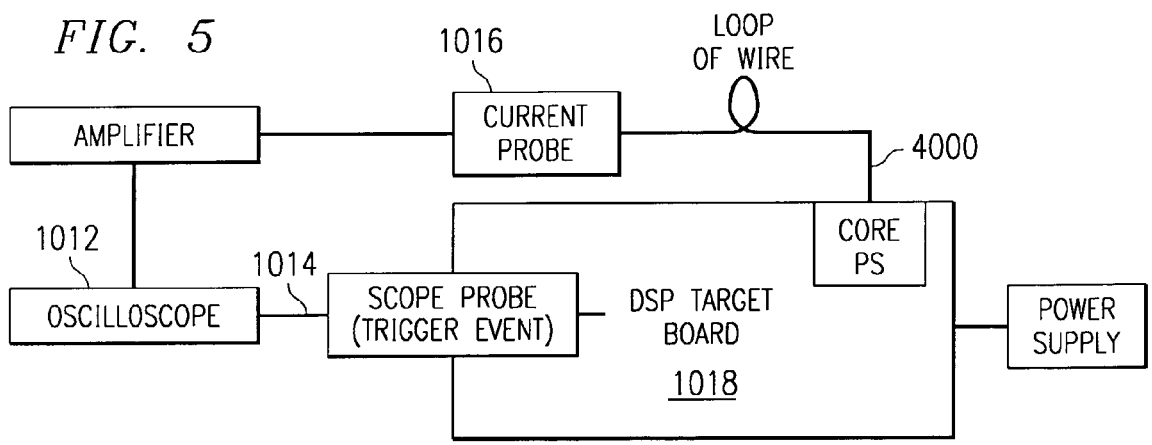
FIG. 5 shows a block diagram of target system appropriately modified and connected up to measure power consumption.

To perform power measurements, target system 1018 may need to be modified to permit connection of current probe 1016 at an appropriate power measurement point. FIG. 4 illustrates a typical modification. Wire loop 4000, which is kept as short as possible while still accommodating the connection of current probe 1016, is placed between the output of power supply 4002 and load 4004. If there are any large capacitors on the output of power supply 4002, they should be on the same side as the output of the power supply. Such capacitors filter the output of the power supply and slow down its response to increases or decreases in the current demand of load 4004. Placing these capacitors on the input side of current probe 1016 will permit the inclusion of any additional current that such capacitors add as current demands change. FIG. 5 shows a block diagram of target system 1018 appropriately modified and connected up to measure power consumption. Additional background information regarding setting up a power profiling system such as those described in the above embodiments is provided in Texas Instruments Incorporated application report SPRA074 entitled "Target System Power Profiling Via Code Composer Studio." This application report is available at http://www-s.ti.com/sc/techlit/spra074 and is incorporated herein by reference.

Power profiling software 1002, in conjunction with other software executing on the host computer, provides the user interface for setting up power profiling operations and for displaying the resulting power measurement data. In the preferred embodiment, three modes of power profiling are provided: single-range real-time (SR), multifunction non-real-time (MNR), and multifunction real-time (MR).

SR profiling mode allows the user to measure the power consumed by an application while it is executing between two user-selected addresses. This profiling is done in real-time, meaning that target system 1018 is not halted between the two selected addresses. The resulting power measurement data is displayed when execution is halted. MNR and MR profiling modes permit power measurement of user-selected functions in the embedded application. In MNR profiling mode, the application is halted after power measurement data is collected for a selected function and the resulting power measurement data is displayed. In MR profiling mode, power measurement data for each selected function is collected with minimal impact while the application is executing and is displayed when the application completes execution and/or is halted.

Figure 6:
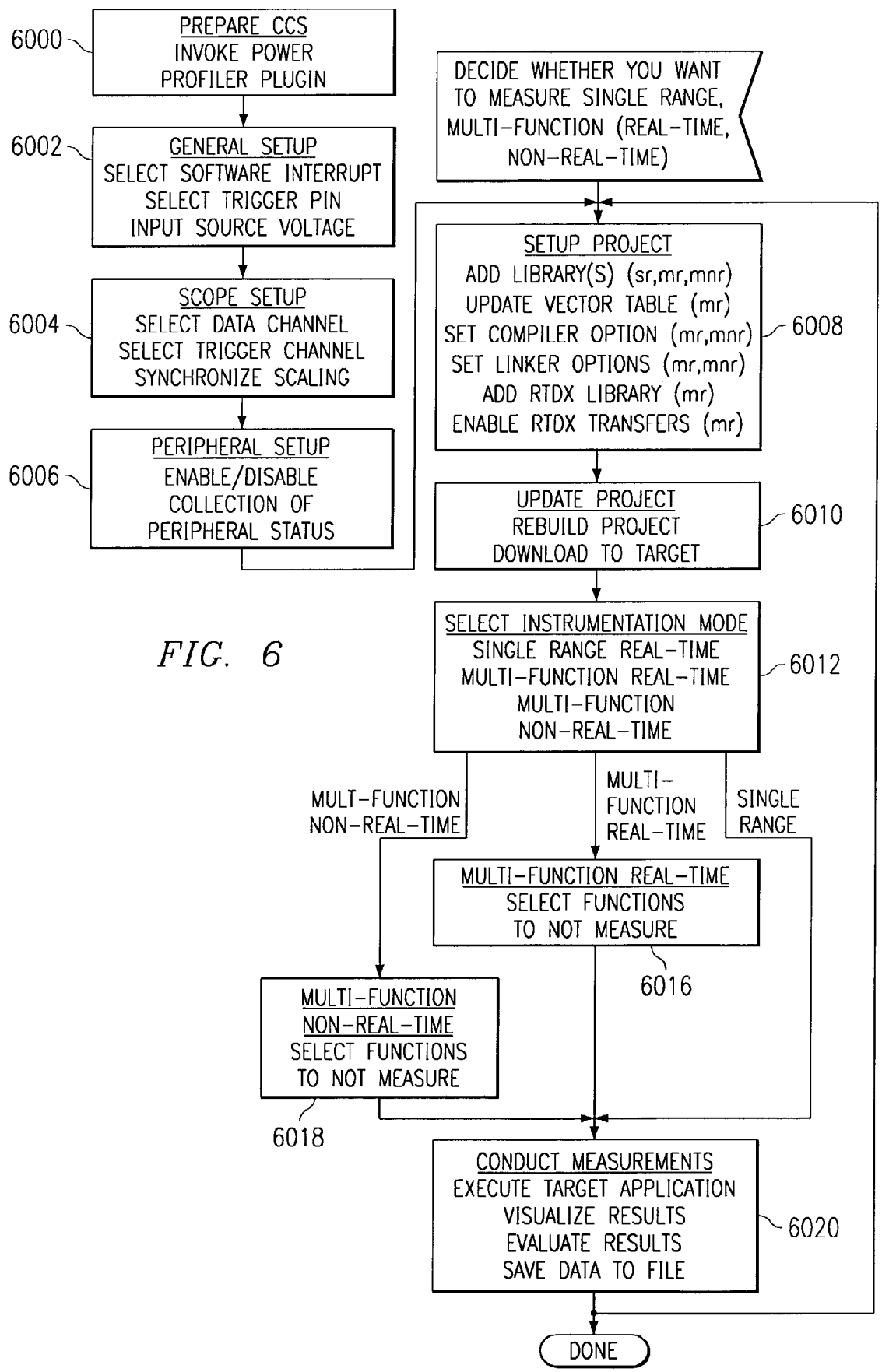
FIG. 6 is a power profiling flowchart.

FIG. 6 presents an exemplary flow of operation for profiling power consumption of target system 1018. The steps of this flow of operation are used as a framework in the following text to illustrate various innovative aspects of the present inventions. This example is presented using the user interface of an integrated software development system comprising a power profiling plugin, Code Composer Studio, developed by Texas Instruments Incorporated. However, other embodiments will be apparent to one skilled in the art. Following the discussion of this exemplary flow of operation, additional details regarding the operation of each power profiling mode are presented in self-titled sections.

Figure 7:
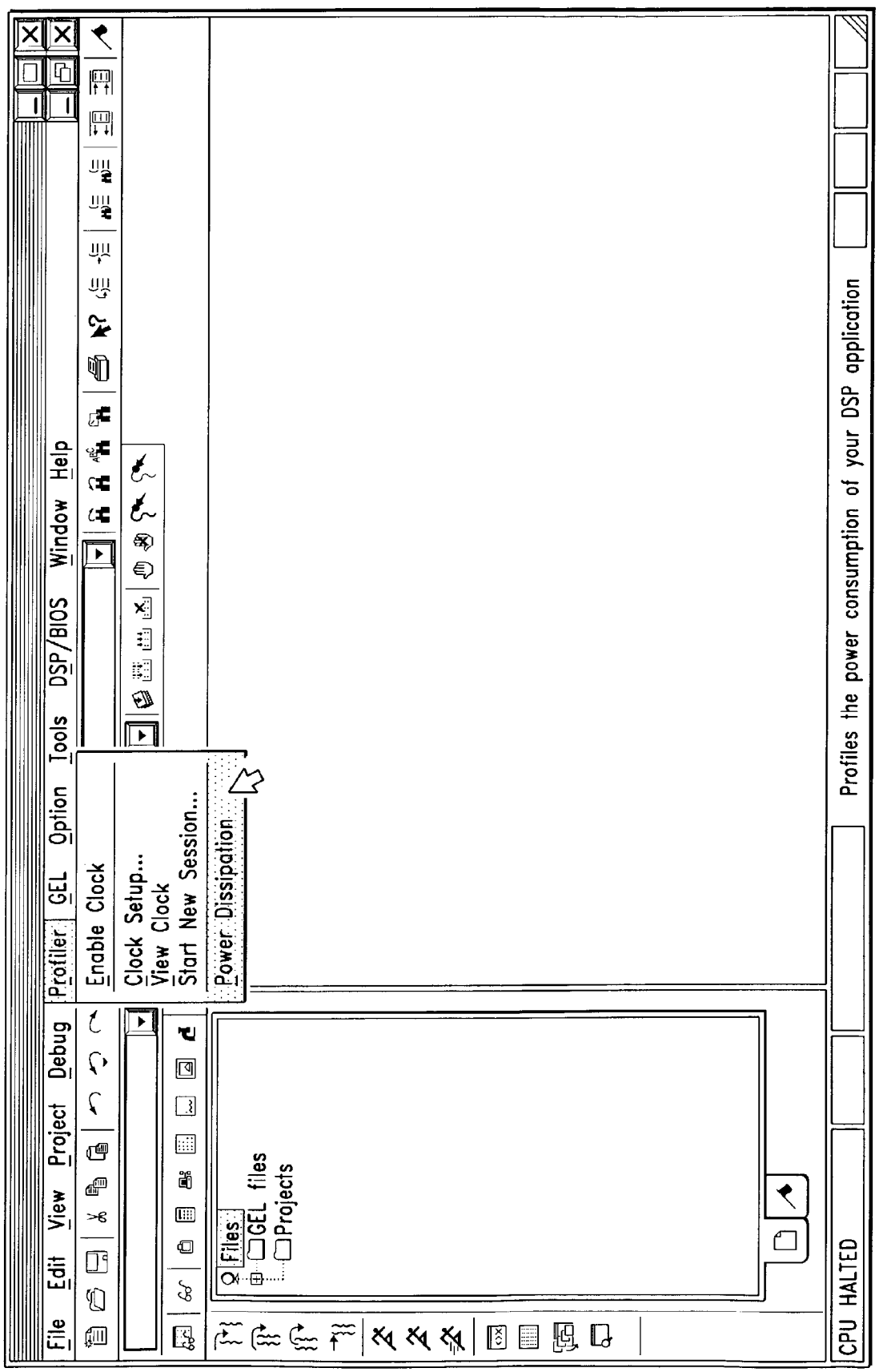
Figure 8A:
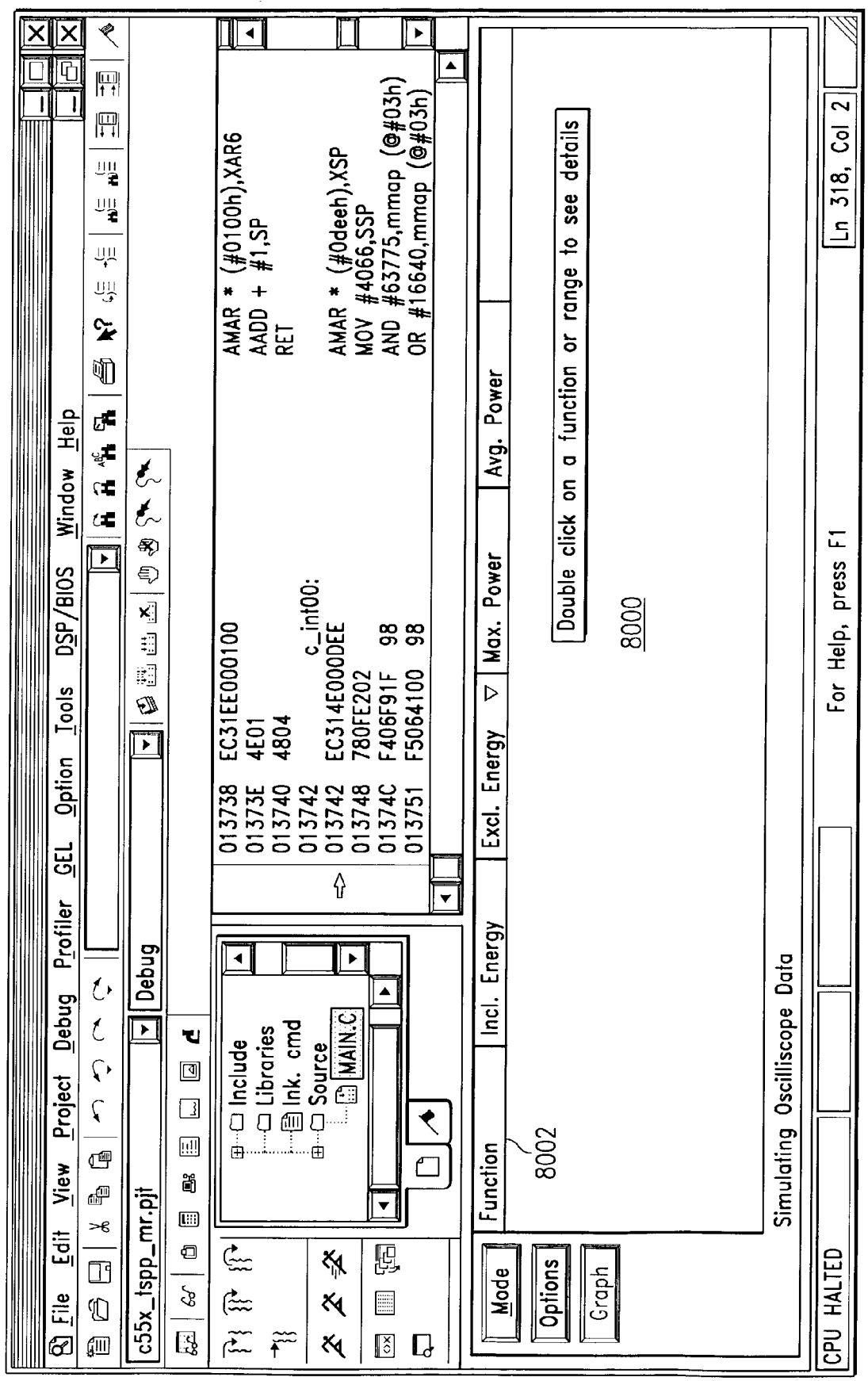
Figure 8B:
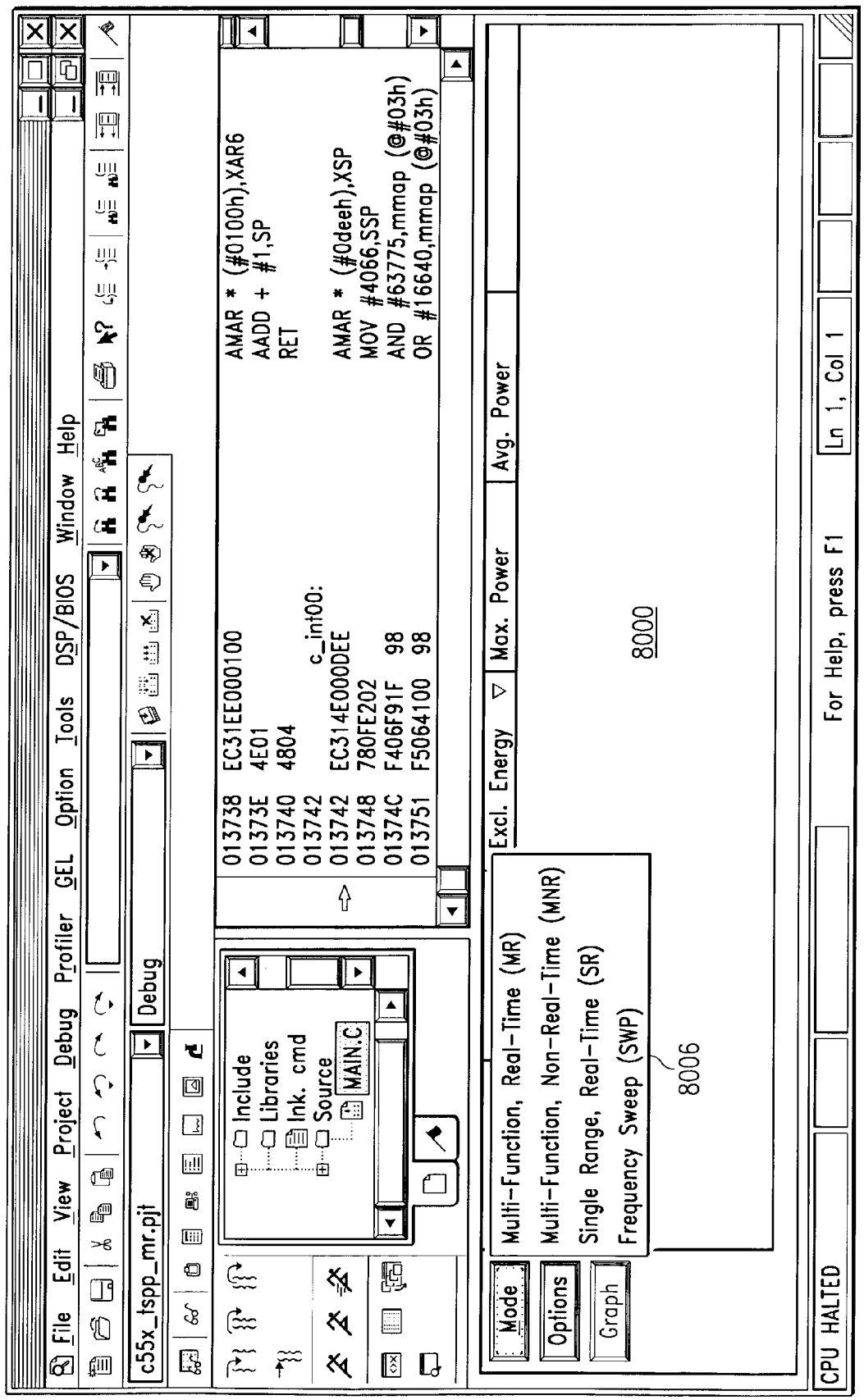
Figure 8C:
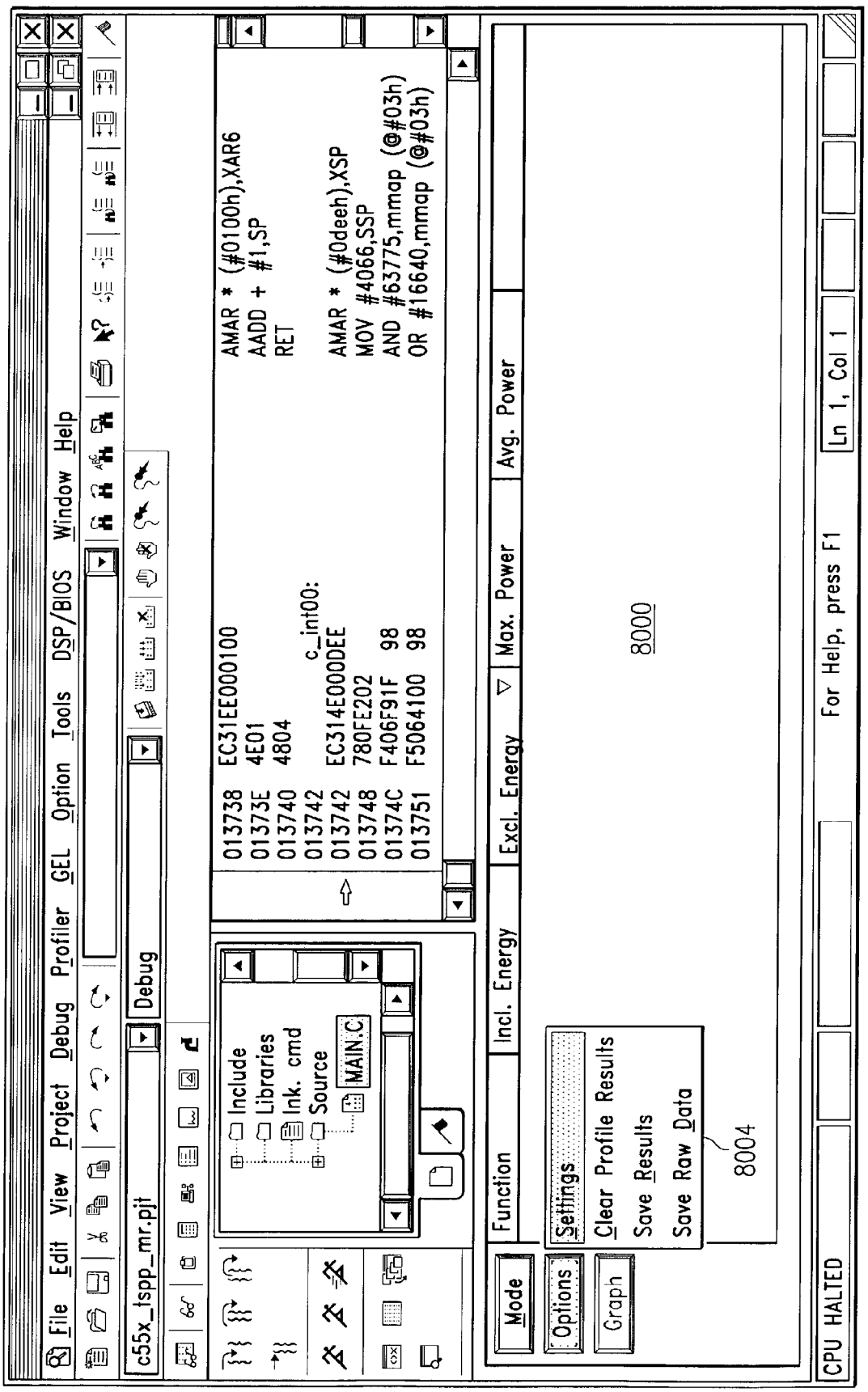

At step 6000, power profiling software 1002 is invoked. FIG. 7 illustrates selecting the Power Dissipation option from the Profiler drop-down menu on the main screen to invoke a power profiling window. FIGS. 8A, 8B, and 8C present power profiling window 8000. The left side of power profiling window 8000 contains buttons for selecting a mode of instrumentation, displaying power measurement graphs, and selecting various options. When the Mode button is selected, menu 8006 is presented to permit the user to select the desired mode of instrumentation. When the Options button is selected, menu 8004 is presented to permit the user to do such things as modifying the settings, clearing or saving results, or saving raw data. Title bar 8002 presents the column titles for the information that power profiling software 1002 collects and displays. This information includes the selected address range or function associated with the data, the total power in milliJoules consumed during execution, including any called functions (inclusive count), the total power consumed during execution of the selected function, excluding any called functions (exclusive count), and the maximum and average power values measured within the address range/function. If status data, i.e., their on/off status, is collected for peripherals such as timers, multichannel buffered serial ports and direct memory access channels, window 8000 will also show that information.

Figure 9:
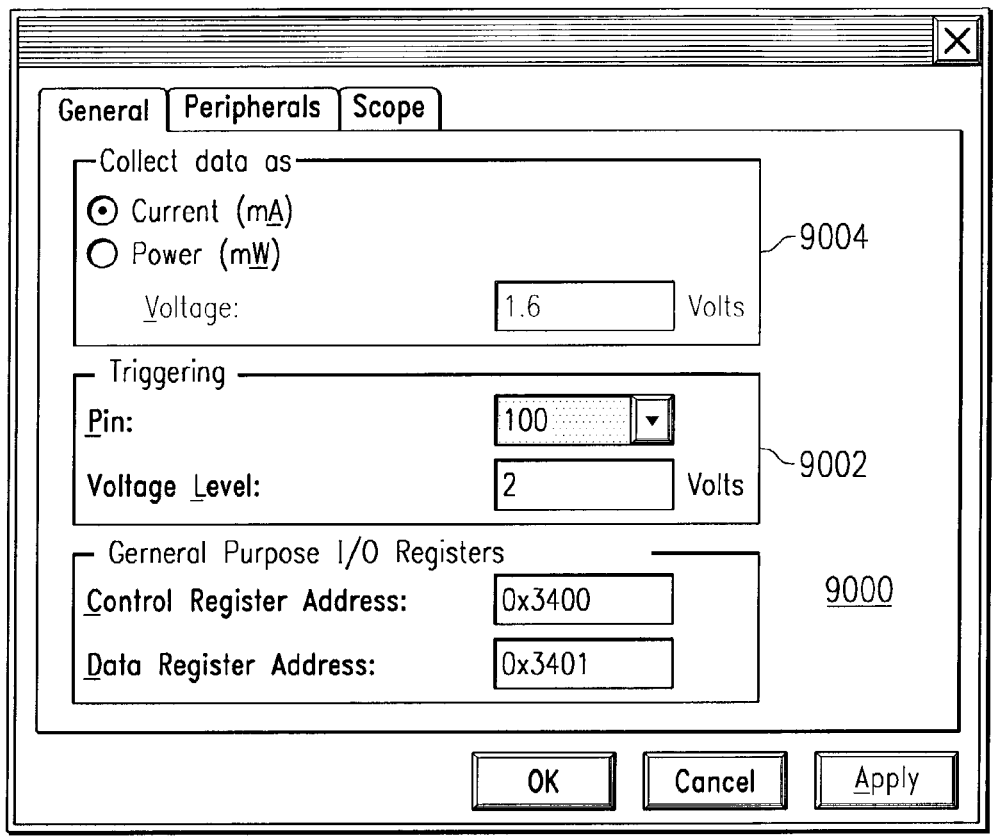

The next step, 6002, is to perform some general setup of the profiling software. FIG. 9 illustrates settings window 9000 which is invoked by selecting the Settings entry of menu 8004 as illustrated in FIG. 8C. Using data collection options 9004, the user may select whether the data is to be collected in milliwatts (power) or milliAmps (current). Collecting data as milliAmps is useful when the voltage changes during execution, i.e., the application is performing dynamic voltage scaling. Using triggering options 9002, the user may select the trigger pin to be used to trigger power measurement device 1012 or 1022 and the voltage of the power supply at the point where current is to be measured on target system 1018. The triggering option selected must correspond to the capabilities of target system 1018. For example, if the power system configuration is that of FIG. 1A or FIG. 1C, EMU0/EMU1 may be selected as the triggering option. If the configuration is that of FIG. 1B, a DSP pin may be selected as the triggering option. The voltage entered will be multiplied with the measured current to compute power values.

Figure 10:
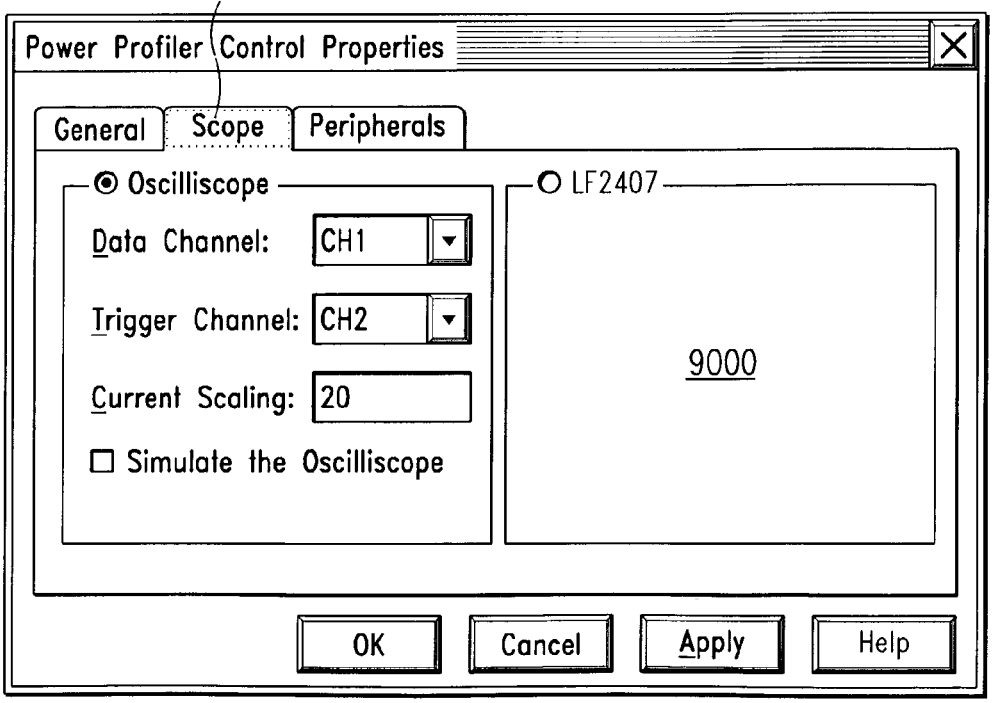

At step 6004, the power measurement device is initialized. In this embodiment, the device is oscilloscope 1012. As FIG. 10 illustrates, scope tab 9002 of control properties window 9000 provides options for selecting the channel for collecting data from current probe 1016 and for the trigger channel of oscilloscope 1012 connected to trigger 1014.

Figure 11:
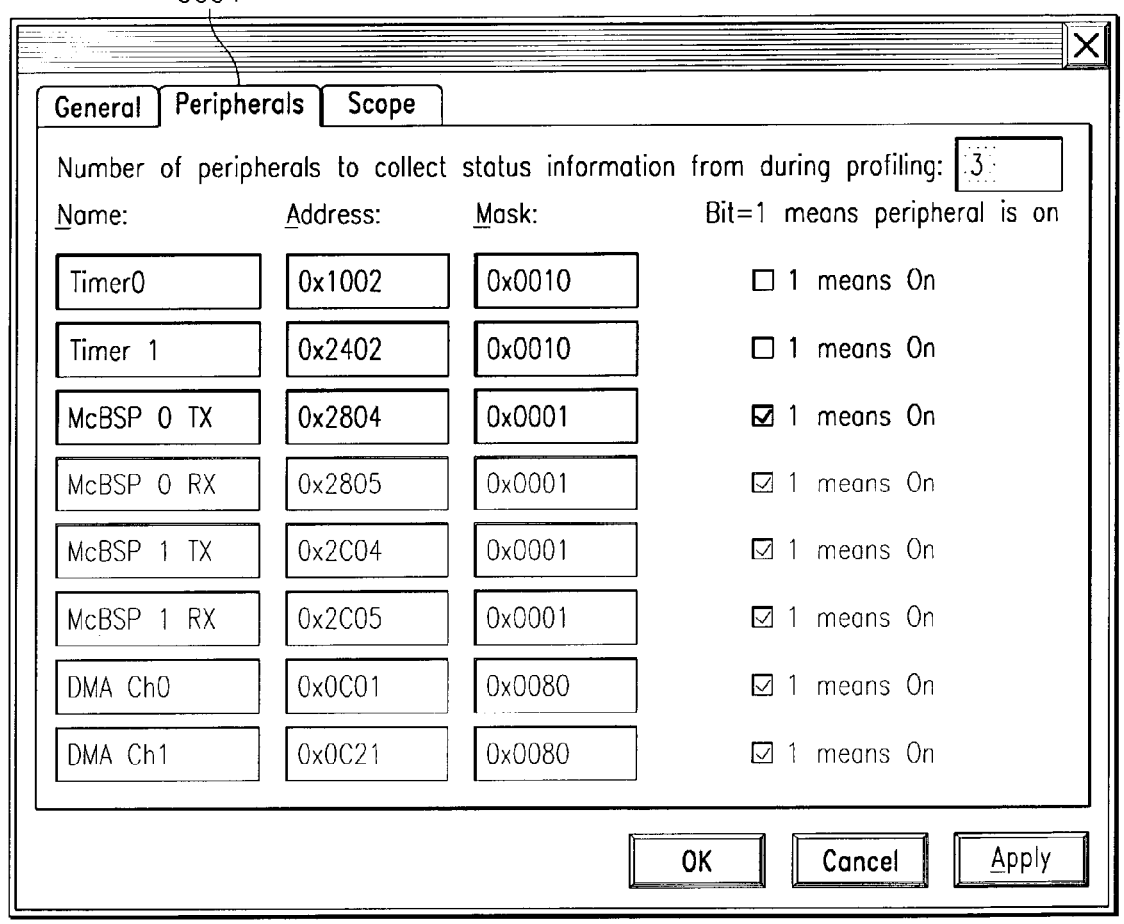

At step 6006, the user may elect to enable or disable collection of peripheral status data. As FIG. 11 shows, the user may select peripherals tab 9004 of control properties window 9000 to access this option. The user may specify the number of peripherals for which status information is to be collected and information about each peripheral. Setting the number of peripherals to be 0 denotes that no peripheral information is to be collected.

In steps 6008 and 6010, the embedded application is modified to support the mode of power profiling the user wants to use. For all three power profiling modes, a target system specific runtime support library must be added. Each runtime support library provides initialization routines for the selected triggering option and trigger functions for doing the actual triggering of the power measurement device and to do any other special processing required by the power profiling mode.

Figure 12:
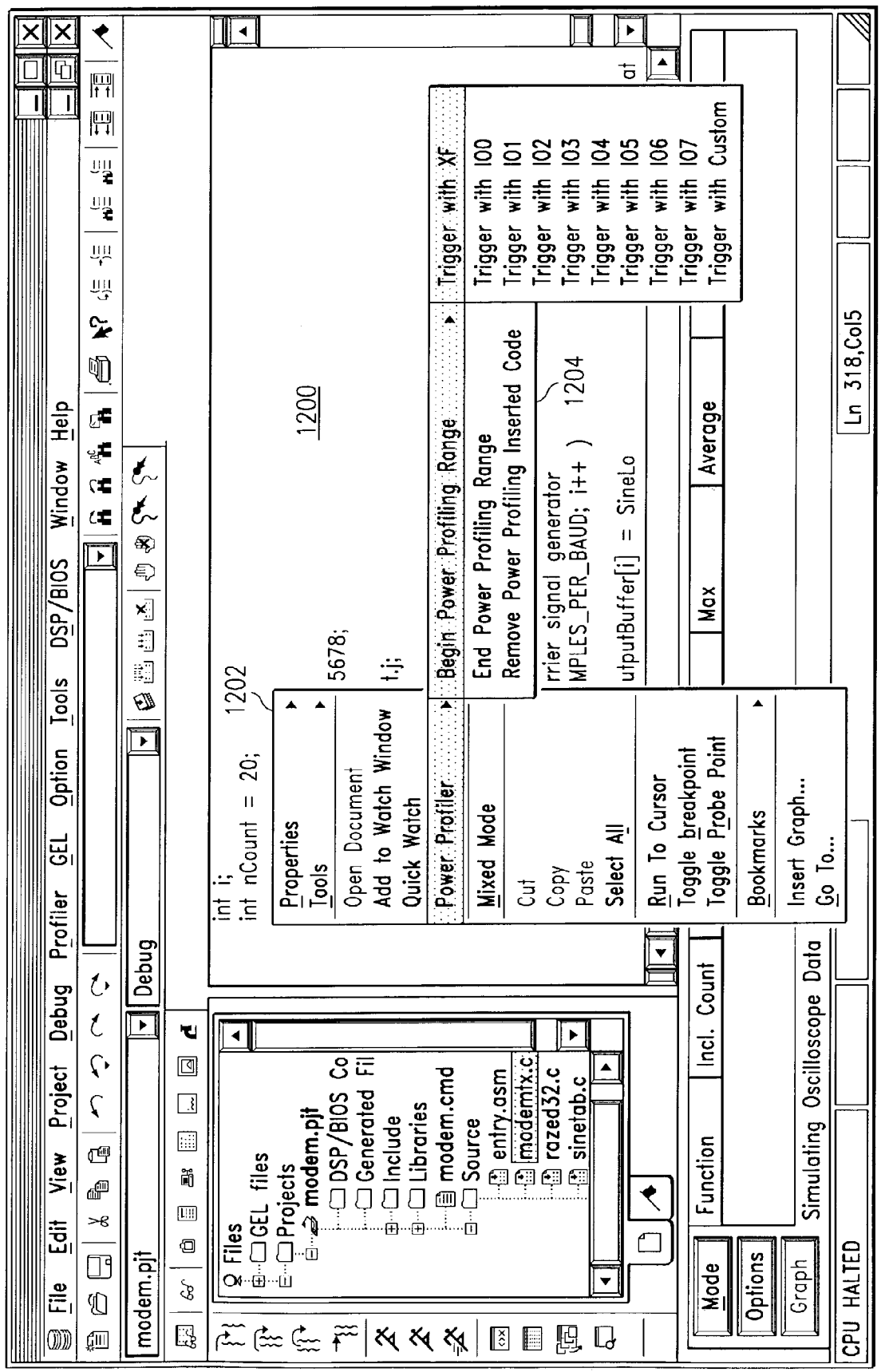

If the user wants to do SR power profiling, the beginning and end points of the range of instructions to be profiled is set at this time. FIG. 12 illustrates how the user sets this profiling range. First, the user selects the source code file of the embedded application where the profiling is to be initiated and its contents are displayed in pane 1200. The user places the mouse on the source code line where profiling is to be started and right clicks. Popup menu 1202 is presented. The user selects the Power Profiler option from the menu and the Begin Power Profiling Range option from profiler submenu 1204. Analogous actions are taken to set the end of the profiling range. In response to these user actions, power profiling software 1002 inserts calls to the required trigger functions provided by the runtime support library in the source code of the embedded application at the selected points.

For MNR and MR power profiling modes, a special compiler option is used to compile the embedded application. This option instructs the compiler to insert NOP instructions at the beginning and end of each function in the application. The number of NOPs inserted is target dependent and based on the calling sequence of the triggering support functions. Also, the application is linked with a special linker option that forces the required support code to be included. These special options eliminate any requirement for the application developer to alter the application source code manually to provide explicit references to the triggering support routines. If MR mode is to be used, a support library for transferring data from target system 1018 to host system 1000 must also be included in the application. For the embodiments of FIGS. 1A-1C, the data transfer mechanism is industry standard RTDX.

Once the embedded application has been appropriately modified as described above, it is recompiled, relinked, and downloaded to target system 1018. At step 6012, the instrumentation mode is selected. FIG. 8B illustrates the popup menu for selecting the power measurement instrumentation mode presented when the user selects mode button 8002 in power profiling window 8000. At this point, power profiling software 1002 performs any initialization that may be required for the selected mode. If MNR or MR profiling mode is selected at step 6012, the embedded application is automatically instrumented by power profiling software 1002. This instrumentation comprises replacing the NOPs inserted by the compiler at the beginning and end of each function with the calling sequences for the required trigger functions. Once the application is instrumented, the user may optionally select functions not to measure at step 6016 if MR mode is selected or at step 6018 if MNR mode is selected. Power profiling software 1002 uninstruments the functions selected at step 6016 or 6018 by replacing the inserted calling sequences with NOP instructions.

Figure 13:
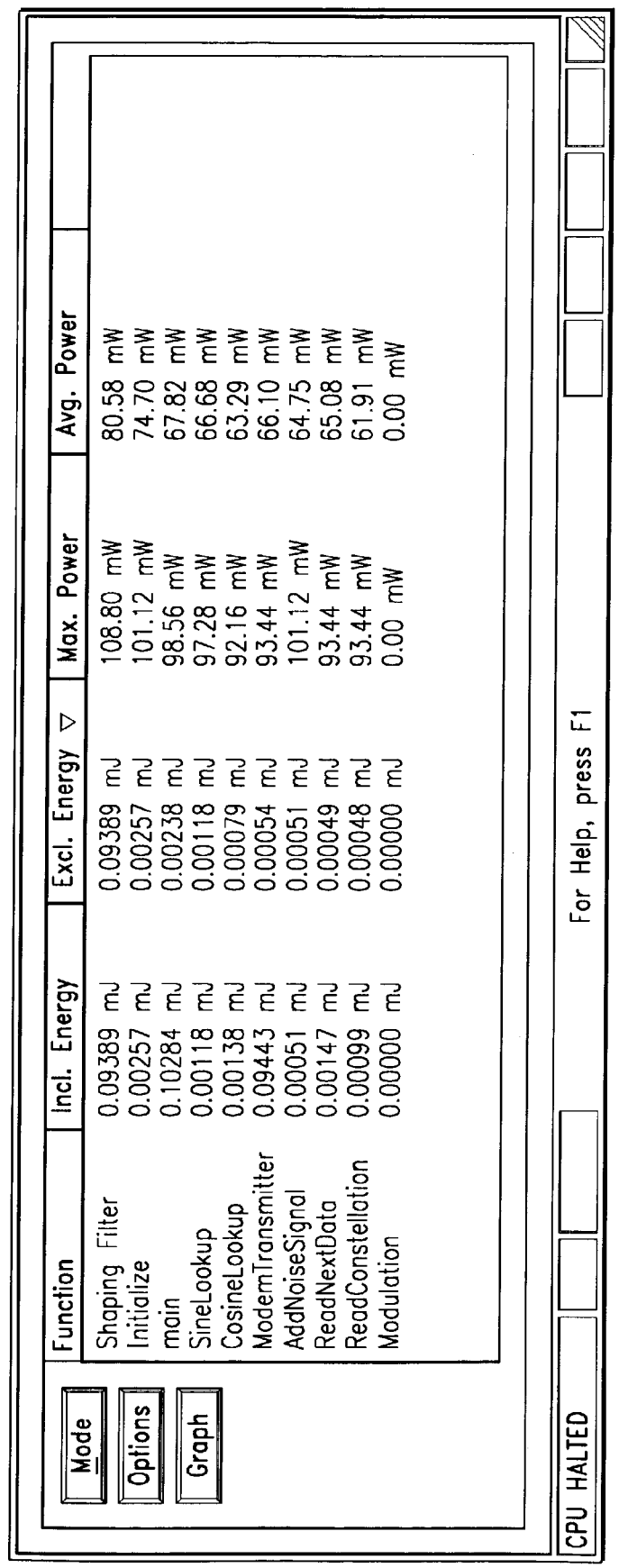
Figure 14:
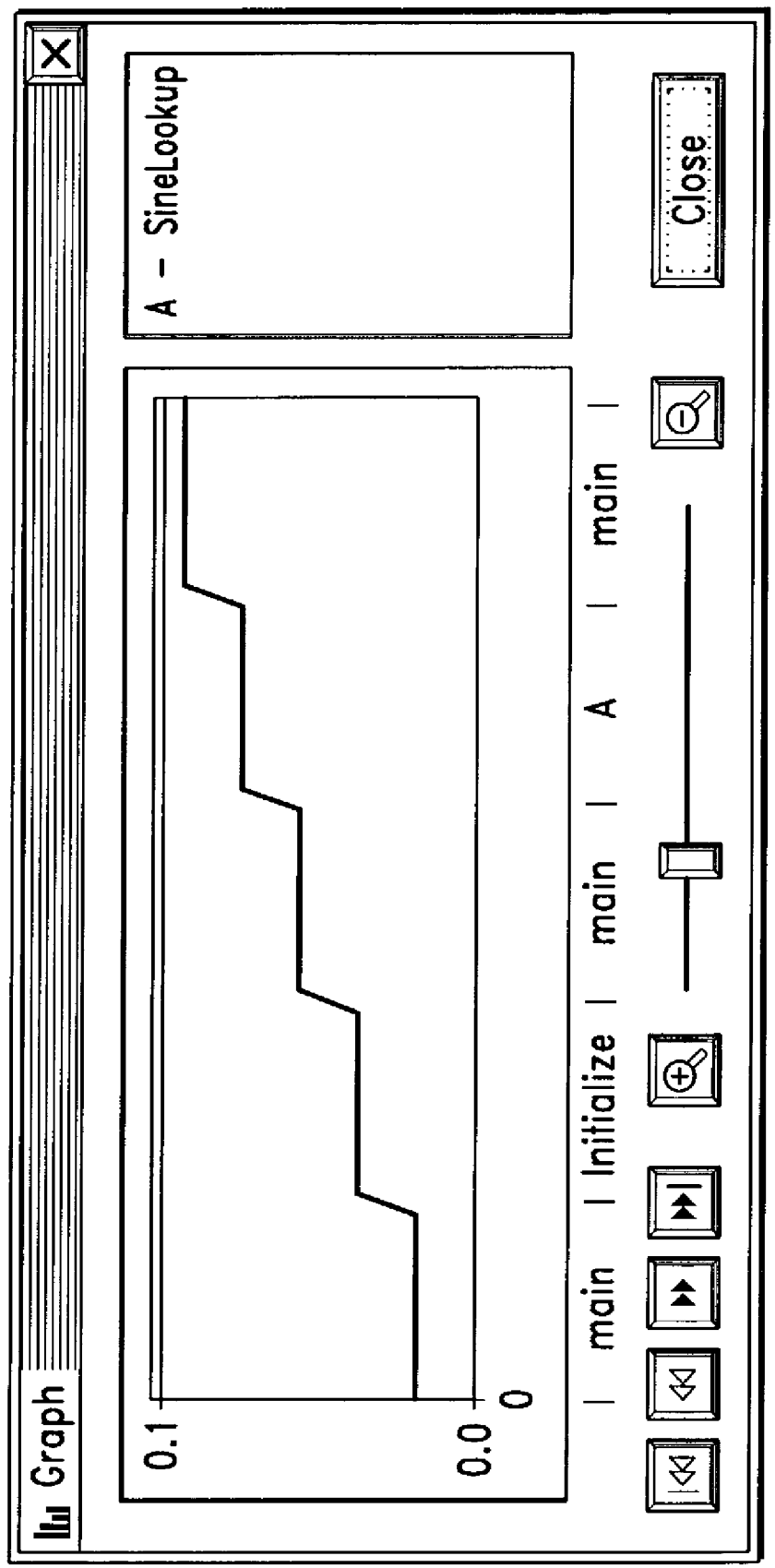

At step 6020, the embedded application is executed. Power measurement data and other execution data is collected, correlated if necessary, and presented to the user. FIGS. 13 and 14 present examples of power measurement data collected from the execution of an embedded application instrumented for one of the multi-function power profiling modes in tabular and graphical formats, respectively.

Multi-function Real-time Profiling

From a high level, in an embodiment, the control flow for multi-function real-time profiling is as follows:

1. The user prepares the embedded application for MR profiling as previously described.
2. The user selects the MR profiling option.
3. Power profiling software 1002 instruments each function to be profiled by replacing the compiler inserted NOPs that are located in the prologue and epilogue code of each function with calls to a profile support routine _TSPP_MRtriggerXXX (where XXX denotes the triggering option selected in step 6002). By default, all functions that were compiled with special compiler mode are instrumented. Following the initial instrumentation, the user can remove individual functions from the list of profiled functions (i.e. select functions to be uninstrumented).

4. The user starts execution of target system 1018 by issuing a Run command.
5. During program execution, any call instruction that was inserted by the profiler as part of the code instrumentation will transfer control to the support routine _TSPP_MRtriggerXXX when it is executed. Each invocation of the support routine will cause steps 6-9 described below to occur.
6. The support routine clears trigger 1014, indicating the end of the previous power measurement.
7. The support routine collects execution data. It determines its return address (which will be a program counter value of an instruction that is part of the function that was being profiled) in a target-dependent fashion. This return address will later be used by the profiler (in step 13) to correlate power measurements to specific functions. Once the return address is determined, the support routine will transfer this program counter value to host computer 1000 using RTDX. In addition to transferring the program counter value, other information may also be transferred. For example, the current state (on/off) of the on-chip peripherals may also be transferred.
8. The support routine sets trigger 1014, indicating the start of the next power measurement.
9. The support routine returns back to the calling function to continue execution of the embedded application.
10. While the application is executing, power profiling software 1002 will retrieve the execution data that is passed to host computer 1000 from target system 1018. As mentioned above in step 7, this data will include program counter values and possibly other information, such as on-chip peripheral information.
11. Either while application is executing, or when execution completes, power profiling software 1002 will retrieve power measurement data from the power measurement device. If the measurement device is oscilloscope 1012, the set of power measurements will be retrieved when the application completes execution. If the measurement device is high-speed measurement board 1022, the set of power measurements may be retrieved while the application is still running.
12. When execution completes, power profiling software 1002 retrieves any remaining execution data stored in its internal buffer on target system 1018.
13. After retrieving the execution data (in step 10 and possibly step 12) and the power measurement data (in step 11), power profiling software 1002 correlates specific power measurements to specific functions by reconstructing the call stack from the execution data using the method described below.
14. Power profiling software 1002 then displays the results as illustrated by FIGS. 13 and 14.

Figure 15:
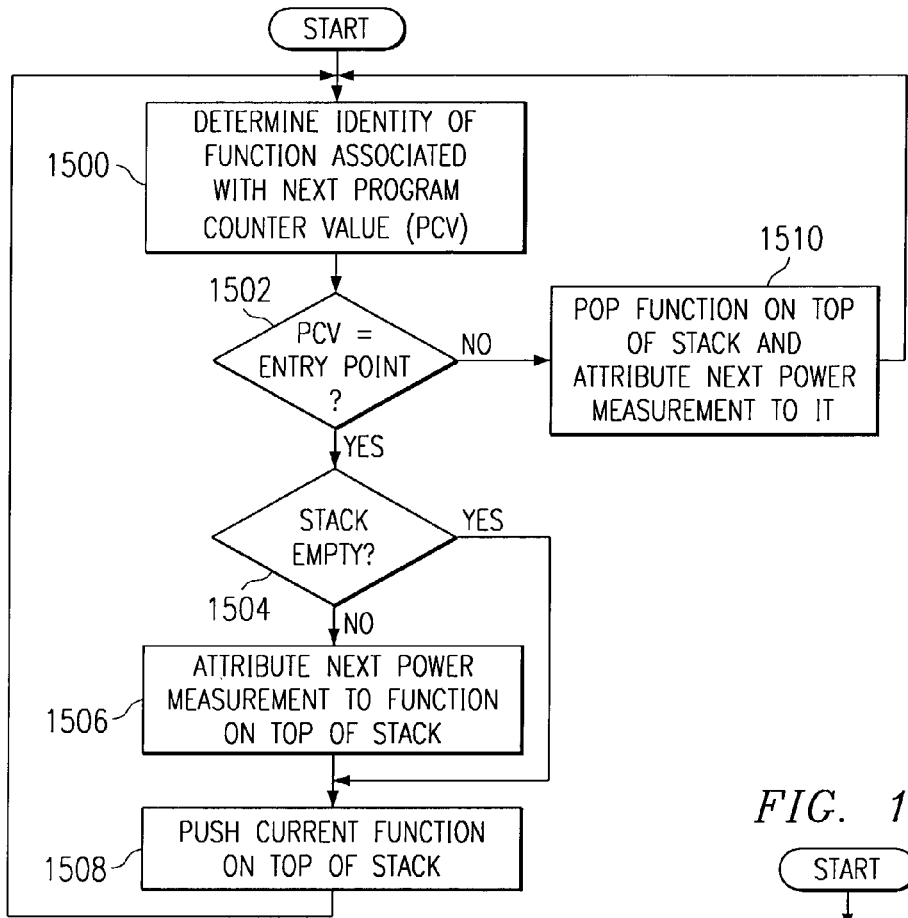

FIG. 15 presents of a flowgraph of a method for correlating power measurement data to the function that was executing at the time the measurement was taken. When the embedded application finishes execution, power profiling software 1002 has a set of power measurements, in the order they were taken, and a set of program counter values that specifies the execution order of the functions. This information is used to reconstruct the runtime call stack, and as a result, correlate a specific power measurement to the exact function that was executing when the power measurement was taken.

At step 1500, the identity of the function associated with a program counter value is determined. At step 1502, a test is made to determine if the program counter value corresponds to the entry or exit of the identified function. If it is an entry point, then step 1504 is executed next. Here, a check is made to determine if the call stack is empty. If it is, then step 1508 is executed and the function identifier is pushed on top of the stack. Processing of the set of program counter values then continues at step 1500 with the next program counter value. If the call stack is not empty at step 1504, then the next power measurement in the time ordered set of power measurements is attributed to the function on top of the call stack and processing continues at step 1508. If the program counter value is not an entry point at step 1502, then it is an exit point. At step 1510, the function at the top of the call stack is popped off the stack and the next power measurement in the set of power measurements is attributed to that function. Processing then continues at step 1500 with the next program counter value.

Consider the application of this correlation method to the example C program in Table 1.

TABLE 1

```
main ( )    { /* PC1 */
   ....          /* measurement M1 */
   func1 ( );
   ....          /* measurement M5 */
}              /* PC6 */
func1 ( )   { /* PC2 */
   ....          /* measurement M2 */
   func2 ( );
   ....          /* measurement M4 */
}              /* PC5 */
func2 ( )   { /* PC3 */
   ....          /* measurement M3 */
}              /* PC4 */
```

In this example, three functions are executed, main, func1, and func2. Assuming that all three functions are profiled, _TSPP_MRtriggerXXX is called six times. This causes six program counter values (PC1-PC6) to be transferred from the target to the host. The ordering of these program counter values corresponds to the execution order of the functions. This example also produces five separate power measurements (M1-M5). The ordering of the measurements also corresponds to the execution order of the functions. Note that there is always one more program counter value than there are power measurements. This is because no measurement is taken prior to entering the first function profiled (main in this example).

Table 2 presents the initial state of the call stack and the sets of program counter values and power measurements for the example of Table 1.

TABLE 2

| | |
|---|---|
| Call Stack | <empty> |
| Program Counter Value Set | PC1, PC2, PC3, PC4, PC5, PC6 |
| Power Measurement Set | M1, M2, M3, M4, M5 |

First, the identity of the function associated with PC1, in this case main, is determined. PC1 corresponds to the entry point for main, so step 1504 is executed. The call stack is initially empty so step 1506 is skipped and no power measurement is consumed. The function main is pushed onto the call stack. Table 3 illustrates the state of the call stack and the measurement sets after the processing of PC1.

TABLE 3

| | |
|---|---|
| Call Stack | main |
| Program Counter Value Set | PC2, PC3, PC4, PC5, PC6 |
| Power Measurement Set | M1, M2, M3, M4, M5 |

Resuming the method at step 1500, the function associated with PC2, func1, is determined. PC2 corresponds to the entry point for func2 (step 1502), so processing proceeds to step 1504. The call stack is not empty, so power measurement M1 is attributed to the function on top of the call stack, main, at step 1506. Func1 is then pushed on top of the call stack at step 1508. Table 4 illustrates the state of the call stack and the measurement sets after the processing of PC2.

TABLE 4

| | |
|---|---|
| Call Stack | func1, main |
| Program Counter Value Set | PC3, PC4, PC5, PC6 |
| Power Measurement Set | M2, M3, M4, M5 |

At step 1500, func2 is found to be the function associated with PC3. Again, PC3 is an entry point and the call stack is not empty, so power measurement M2 is attributed to the function at the top of the stack, func1. Func2 is then pushed onto the stack. Table 5 illustrates the state of the call stack and the measurement sets after the processing of PC3.

TABLE 5

| | |
|---|---|
| Call Stack | func2, func1, main |
| Program Counter Value Set | PC4, PC5, PC6 |
| Power Measurement Set | M3, M4, M5 |

Resuming at step 1500, PC4 is determined to be associated with func2. At step 1502, it is found to be an exit point rather than an entry point, so step 1510 is executed. The function identifier at the top of the stack, func2, is popped and the power measurement M3 is attributed to it. Table 6 illustrates the state of the call stack and the measurement sets after the processing of PC4.

TABLE 6

| | |
|---|---|
| Call Stack | func1, main |
| Program Counter Value Set | PC5, PC6 |
| Power Measurement Set | M4, M5 |

Returning to step 1500, PC5 is now processed. PC5 corresponds to the exit point for func1, so again step 1510 is executed. The function identifier at the top of the stack, func1, is popped and power measurement M4 is attributed to it. Table 7 illustrates the state of the call stack and the measurement sets after the processing of PC5.

TABLE 7

| | |
|---|---|
| Call Stack | main |
| Program Counter Value Set | PC6 |
| Power Measurement Set | M5 |

Returning to step 1500, PC6 is now processed. PC6 corresponds to the exit point for main, so again step 1510 is executed. The function identifier at the top of the stack, main, is popped and power measurement M5 is attributed to it. Table 8 illustrates the state of the call stack and the measurement sets after the processing of PC6.

TABLE 8

| | |
|---|---|
| Call Stack | <empty> |
| Program Counter Value Set | <empty> |
| Power Measurement Set | <empty> |

Multi-function Non-real-time Profiling

From a high level, in an embodiment, the control flow for multi-function non real-time profiling is as follows:

1. The user prepares the embedded application for MNR profiling as previously described.
2. The user selects the MNR profiling option.
3. Power profiling software 1002 instruments each function that will be profiled. That is, the power profiler replaces the compiler inserted NOPs that are located in the prologue and epilogue code of each function with calls to the profile support routine TSPP_MNRtriggerXXX. Following the initial instrumentation, the user can remove individual functions from the list of profiled functions (i.e. select functions to be uninstrumented). As part of the instrumentation, power profiling software 1002 sets a breakpoint at the address specified by the symbol _TSPP_MNRstopXXX.
4. The user starts execution of target system 1018.
5. During program execution, any call that was inserted as part of the code instrumentation will transfer control to the support routine _TSPP_MNRtriggerXXX when it is executed. Each invocation of the support routine will cause steps 6-12 described below to occur.
6. The support routine clears trigger 1014, indicating the end of the previous power measurement.
7. The support routine hits the breakpoint, which was set in step 3, at the address specified by the symbol _TSPP_MNRstopXXX. At this point execution is halted.
8. The power profiler reads the power measurement from the measurement device and attributes the measurement to the correct function using a correlation method. If peripheral status is also being gathered, profiling software 1002 reads the status of the peripherals from the target and updates the function's peripheral usage information.
9. Power profiling software 1002 then updates the results displayed in Pane 8000.
10. Power profiling software 1002 then restarts execution of the embedded application.
11. The support routine restarts and sets trigger 1014, indicating the start of the next measurement.
12. Execution of the support routine returns back to the calling function.
13. Execution continues until the next profile point is encountered, and the control flow repeats at step 5.

Figure 16:
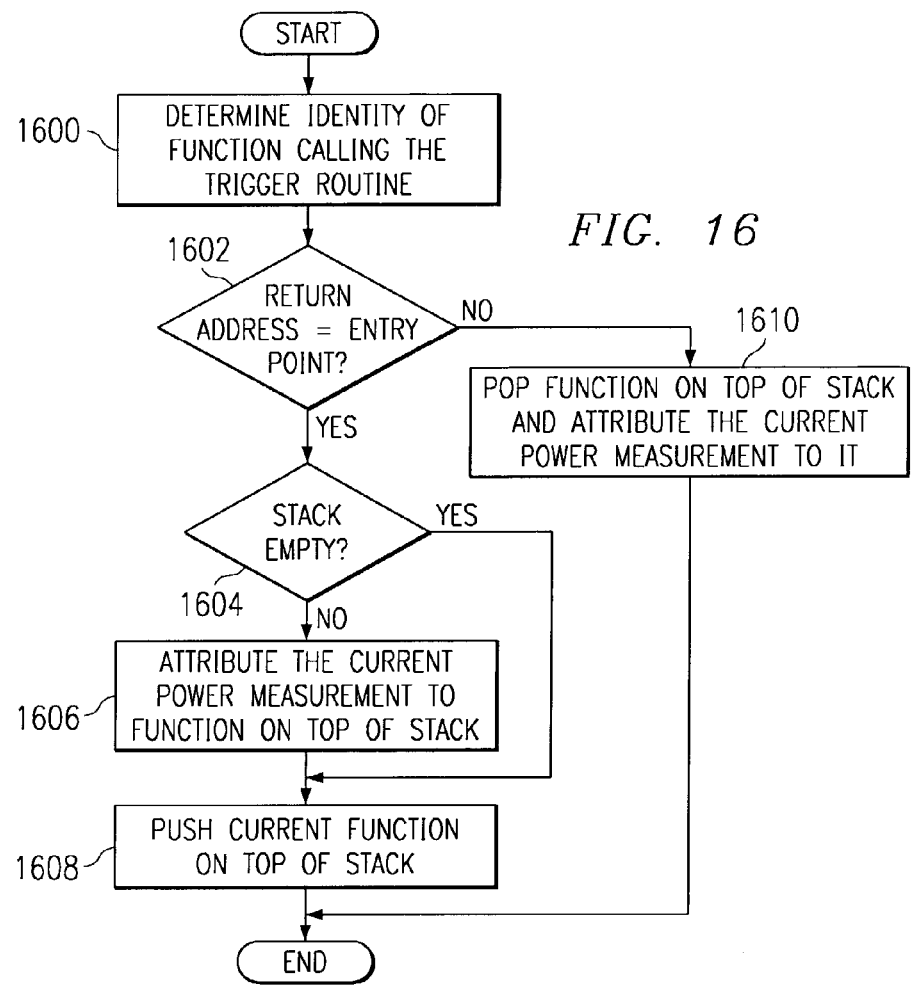

FIG. 16 presents of a flowgraph of a method for correlating the current power measurement to the currently executing function when in multi-function non-real-time mode. When the embedded application is halted at the _TSPP_MNRstopXXX breakpoint, power profiling software 1002 correlates the most recent power measurement to the function that was executing when the measurement was taken. To accomplish this, it maintains a version of the runtime call stack and updates this stack each time the breakpoint is encountered.

To build the call stack, power profiling software 1002 determines what function called _TSPP_MNRtriggerXXX, and whether the call was made from the function's entry point or just prior to the function's exit point. At step 1600, the identity of the function calling the trigger function is determined based on the return address of trigger function. At step 1602, a test is made to determine if the return address corresponds to the entry or exit of the identified function. If it is an entry point, then step 1604 is executed next. Here, a check is made to determine if the call stack is empty. If it is, then step 1608 is executed and the function identifier is pushed on top of the stack. The method then terminates. If the call stack is not empty at step 1604, then the current power measurement is attributed to the function on top of the call stack and processing continues at step 1608, where the current function identifier is pushed on the call stack. If the return address is not an entry point at step 1602, then it is an exit point. At step 1610, the function at the top of the call stack is popped off the stack and the current power measurement is attributed to that function. The method then terminates.

Consider the application of this correlation method to the example C program in Table 9.

TABLE 9

```
main ( )      { /* RA1 */
   ....           /* measurement M1 */
   func1 ( ) ;
   ....           /* measurement M5 */
}              /* RA6 */
func1 ( )     { /* RA2 */
   ....           /* measurement M2 */
   func2 ( ) ;
   ....           /* measurement M4 */
}              /* RA5 */
func2 ( )     { /* RA3 */
   ....           /* measurement M3 */
}              /* RA4 */
```

In this example, three functions are executed, main, func1, and func2. Assuming that all three functions are profiled, _TSPP_MNRtriggerXXX is called six times and six breakpoints occur. There will be six return address (RA1-RA6) and five power measurements (M1-M5) to be correlated. Table 10 presents the initial state of the call stack prior to the execution of the example of Table 9.

TABLE 10

| Call Stack | <empty> |
|---|---|

When function main is executed, TSPP_MNRtriggerXXX is called and the first breakpoint occurs. First, at step 1600, the identity of the function associated with RA1, in this case main, is determined. RA1 corresponds to the entry point for main, so step 1604 is executed. The call stack is initially empty so step 1606 is skipped. The function main is pushed onto the call stack. Execution of the application is then resumed. Table 11 illustrates the state of the call stack after the processing of RA1.

TABLE 11

| Call Stack | main |
|---|---|

At the next breakpoint, the function associated with RA2, func1, is determined at step 1600. RA2 corresponds to the entry point for func2 (step 1602), so processing proceeds to step 1604. The call stack is not empty, so the current power measurement M1 is attributed to the function on top of the call stack, main, at step 1606. Func1 is then pushed on top of the call stack at step 1608. Execution of the application is then resumed. Table 12 illustrates the state of the call stack and the measurement sets after the processing of PC2.

TABLE 12

| Call Stack | func1, main |
|---|---|

At the next breakpoint, func2 is found to be the function associated with RA3. Again, RA3 is an entry point and the call stack is not empty, so the current power measurement M2 is attributed to the function at the top of the stack, func1. Func2 is then pushed onto the stack. Execution of the application is then resumed. Table 13 illustrates the state of the call stack and the measurement sets after the processing of PC3.

TABLE 13

| Call Stack | func2, func1, main |
|---|---|

At the next breakpoint, RA4 is determined to be associated with func2. At step 1602, it is found to be an exit point rather than an entry point, so step 1610 is executed. The function identifier at the top of the stack, func2, is popped and the current power measurement M3 is attributed to it. Execution of the application is then resumed. Table 14 illustrates the state of the call stack and the measurement sets after the processing of RA4.

TABLE 14

| Call Stack | func1, main |
|---|---|

At the next breakpoint, RA5 is processed. RA5 corresponds to the exit point for func1, so again step 1610 is executed. The function identifier at the top of the stack, func1, is popped and current power measurement M4 is attributed to it. Execution of the application is then resumed. Table 15 illustrates the state of the call stack and the measurement sets after the processing of RA5.

TABLE 15

| Call Stack | main |
|---|---|

At the final breakpoint, RA6 is processed. RA6 corresponds to the exit point for main, so again step 1610 is executed. The function identifier at the top of the stack, main, is popped and current power measurement M5 is attributed to it. Execution of the application is then resumed. Table 16 illustrates the state of the call stack and the measurement sets after the processing of RA6.

TABLE 16

| Call Stack | <empty> |
|---|---|

Single Range Profiling

From a high level, the control flow for multi-function non real-time profiling is as follows:

1. The user prepares the embedded application for SR profiling as previously described.
2. The user selects the SR profiling option.
3. The user starts execution of target system 1018.
4. When execution is completed, power profiling software 1002 reads the power measurements from the measurement device (oscilloscope 1012 or measurement board 1022) and reads the peripheral information if it has been requested.
5. Power profiling software 1002 then displays the results in Pane 8000.

The user can choose a special form of single range profiling that supports multiple executions of the embedded application. In this case, power profiling software 1002 will execute the application multiple times without user intervention. The final results are the average power consumption for all the executions.

To use this form of profiling, the user tells power profiling software 1002 how many times the application is to be executed when SR mode is selected. When performing multiple executions, power profiling software 1002 initiates each execution.

Figure 17:
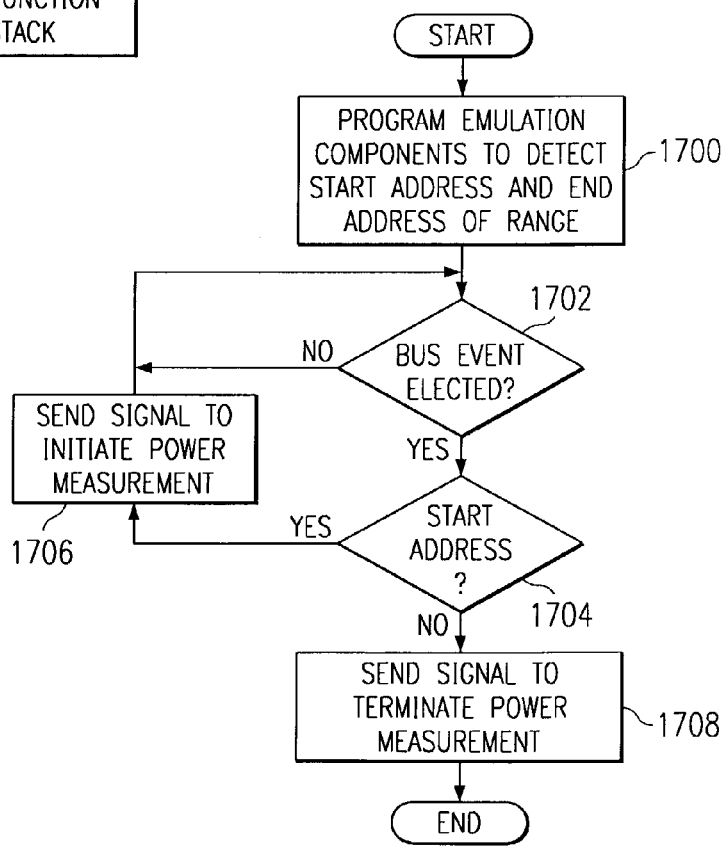

FIG. 17 illustrates an alternate, unobtrusive method of single range power profiling for target systems comprised of DSPs such as DSP 1010 of FIGS. 1A and 1C. As previously discussed, DSP 1010 comprises emulation components that may be programmed to generate the trigger signals and emulation circuitry providing a standard JTAG debug interface with two additional terminals or pins EMU0 and EMU1, supporting various extended debugging capabilities. No instrumentation of the application is required. Instead, when the user selects the beginning and end points of the range of instructions to be profiled, power profiling software 1002 causes the required emulation components to be programmed to monitor the address bus for the selected start address and end address (step 1700). As shown in steps 1702-1706, when the start address is detected, a trigger signal is sent on EMU0 to start power measurement. And, as illustrated in the sequence of steps 1702, 1704, 1708, when the end address is detected, a trigger signal is sent on EMU1 to terminate power measurement.

Figure 18:
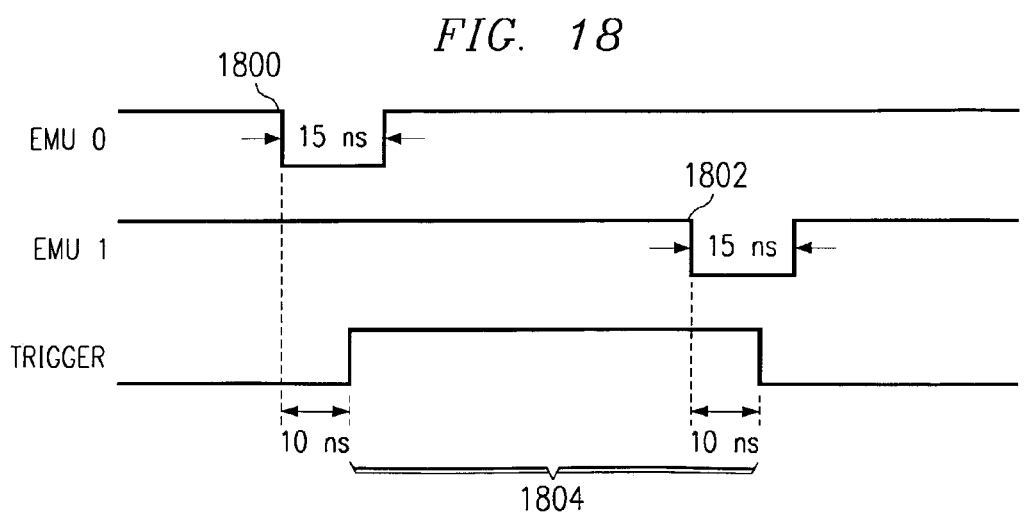
FIG. 18 illustrates the operation of the latch between the JTAG port and the emulation controller during single range power profiling.

FIG. 18 illustrates the operation of latch 1006 during single range power profiling. At start point 1800, EMU0 is pulsed to indicate the execution of the instruction at the selected start address of the range. This 15 ns pulse causes the trigger signal to latch, sending a signal via trigger 1014 to the attached power measurement device. The trigger signal remains high, as indicated by trigger width 1804, until the execution of the instruction at the selected end address of the range. Then, at end point 1802, EMU1 is pulsed to clear the trigger signal. The 15 ns for the pulse width of the EMU pin pulse is representative of three clock cycles on a 200 MHZ DSP. The 10 ns for the delay in the latch is dependent on the source voltage to latch 1006, assumed here to be three volts.

In addition to the above described methods for measuring the power consumption of discrete software units such as address ranges or functions of an embedded application, methods have been developed for measuring the power consumption of the software tasks performed during execution.

Task-Level Real-Time Profiling

Figure 21:
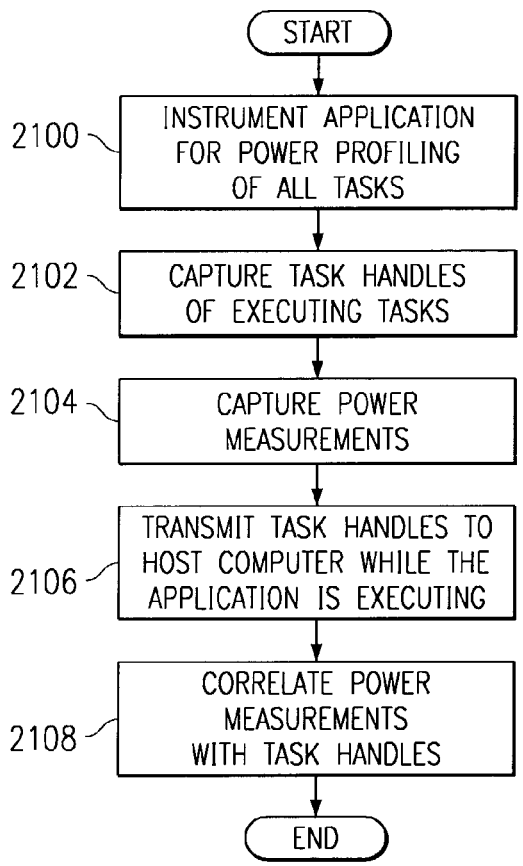

Task-level real-time profiling (TR) allows measurement of the power consumption of each task executed in an embedded application. This includes both statically and dynamically created tasks. FIG. 21 presents a flowgraph of a method for task-level real-time power profiling of an embedded application. At step 2100, the embedded application is instrumented to permit power profiling of all tasks that will be executed when the application is run. In an embodiment such as that of FIGS. 1A-1C, this instrumentation consists of linking in profile support code tailored to target hardware 1018 and trigger 1014 be used on host computer 1000, downloading the application to target hardware 1018, and selecting the TR profiling mode in power profiling software 1002. Power profiling software 1002 replaces the current address of the task switch hook function provided by the operating system of the embedded application with the address of a trigger function _TSPP_switch-fxn_XXX_tr. This causes the trigger function to be executed each time there is a task context switch while the embedded application is executing.

Task hook functions are well known to those skilled in the art. Such hook functions are provided by an operating system to permit an application to specify functions to be called whenever the state of a task changes, such as when a task is created, deleted, exited, or when a context switch occurs. One implementation of such hook functions is described in more detail in Section 2.25 of "TMS320C6000 DSP/BIOS Application Programming Interface (API) Reference Guide". This section is incorporated herein by reference as background material. The entire document is available at http://www-s.ti.com/sc/psheets/spru403d/spru403d.pdf.

More specifically, in an embodiment, when replacing the task switch hook function, power profiling software 1002 performs the following steps:

1. Determines the address of the function that the application may have specified as the task switch hook function by reading the value of the variable referred to by the symbol _KNL_tswitchfxn.
2. If the user specified hook function is NULL, the value 0 is written into the variable referred to by the symbol _TSPP_switchfxn_user_hook. Otherwise, the address of the application hook function is written into the variable referred to by _TSPP_switchfxn_user_hook.
3. Writes the address of the trigger function _TSPP_switchfxn_XXX_tr into the variable referred to by the symbol _KNL_tswitchfxn.

These steps preserve the address of any application specified task switch hook function so that it may be executed after the trigger support function is executed.

After the embedded application is instrumented for TR profiling, the user starts execution. During this execution, steps 2102-2104 of the method are performed. Any task context switch that occurs transfers control to the trigger function _TSPP_switchfxn_XXX_tr. Each invocation of the trigger function causes the following steps to occur:

1. The trigger function clears trigger 1014, indicating the end of the previous measurement. This causes a power measurement to be captured on the power measurement device.
2. The trigger function determines the task handle for the new task, which will begin executing when the context switch has completed. Once the handle is determined, the trigger function initiates transfer of the handle to the host computer 1000. In addition to the task handle, other information, such as the current state (on/off) of the on-chip peripherals, may also be collected for transfer.
3. The trigger function sets trigger 1014, indicating the start of the next measurement.
4. The trigger function calls the application's original hook function that was overridden if such function was present. The address of the original hook function is stored in the variable _TSPP_switchfxn_user_hook. If the value of this variable is 0, this indicates that there was no user hook function. Note that the user hook function is called after trigger 1014 is set. Therefore, the power consumed by the user hook function is measured and will be attributed to the new task.
5. Execution of the support routine returns back to the caller to continue execution of the application.

As indicated by step 2106, the task handles are transferred to the host computer while the application is executing. The actual method for retrieving the task handles and other data depends on the transfer method used by target system 1018. For an embodiment, the transfer method is RTDX.

Either while the application is executing, or when execution completes, power profiling software 1002 retrieves power measurement data from the measurement device. If the measurement device is oscilloscope 1012, the set of power measurements is retrieved when the application completes execution. If the measurement device is high-speed measurement board 1022, the power measurement data may be retrieved while the application is still running.

When execution of the application is complete, the power measurement data is correlated with the collected task handles at step 2108 to attribute specific power measurements to specific tasks. When the application finishes execution (or execution is manually halted), power profiling software 1002 has a set of power measurements in the order they were taken, and a set of task handles that specify the execution order of the tasks. The ordering of the set of task handles and the set of power measurements is such that there is a one-to-one correspondence between the respective elements of the sets. This is possible because the first call to the profile support routine occurs before any measurement is taken. The support routine initiates the transfer of the task handle of the task that will start executing when the task switch is complete (i.e. the handle for the new task). It does not transfer the handle of the task that was executing when the switch occurred (i.e. the old task handle). On all subsequent context switches, the power measurement that has just been taken corresponds to the old task. This task is the same task whose handle was transferred in the previous task switch. In other words, the new task in the nth context switch is also the old task in the nth+1 context switch.

Figure 22:
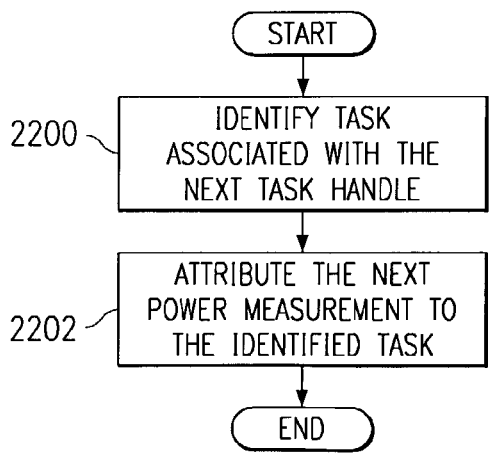

Using this information, a specific power measurement may be correlated to the exact task that was executing when the power measurement was taken. FIG. 22 illustrates one such method for correlating power measurements with the appropriate tasks. For each task handle in the set of task handles, the steps 2200 and 2202 are executed. At step 2200, the task associated with the task handle is identified and at step 2202, the next power measurement in the ordered set of power measurements is attributed to that task. For example, if an application has tasks T1, T2, T3, and T4 whose execution order is: T4, T3, T2, T1, T4, T3, T2, T1, the set of task handles and the set of power measurements will be TH4, TH3, TH2, TH1, TH4, TH3, TH2, TH1 and M1, M2, M3, M4, M5, M6, M7, M8 respectively When the method is applied, measurement M1 is attributed to T4, M2 is attributed to T3, etc. Note that TH1 is the task handle for T1, TH2 is the task handle for TH2, etc.

In an implementation of the above method, power profiling software 1002 maintains a hash table of pointers to ProfileTask objects. The keys to this hash table are based on the task handles. For each task handle, the hash table is checked to see if this particular task handle has already been encountered. If it has not, a new ProfileTask object is created. The task associated with the task handle is identified by looking it up in the symbol table created when the embedded application was created and the task name is stored in the ProfileTask object. The next power measurement in the set of power measurement is also stored in the ProfileTask object. If the task handle has already been encountered, the ProfileTask object associated with the task handle is updated with the next power measurement in the set of power measurements.

Figure 23:
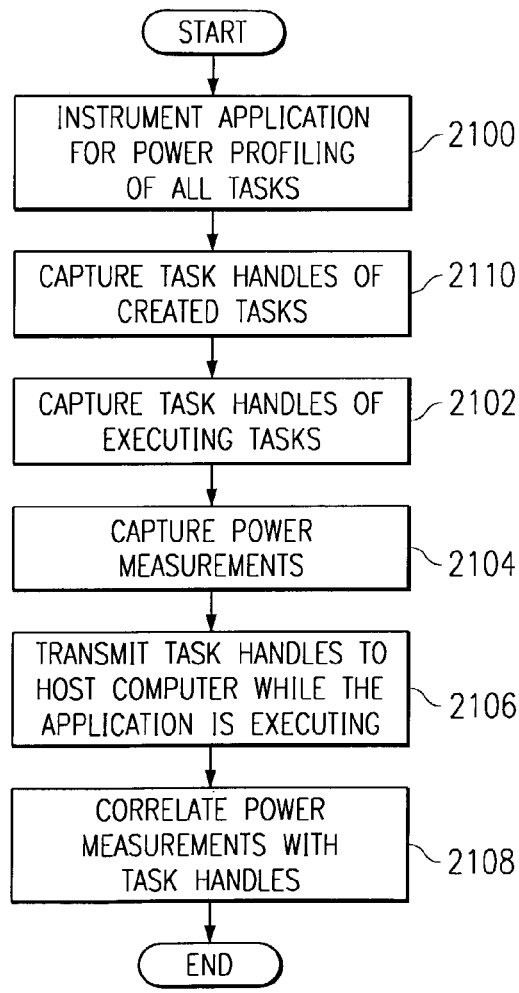

The method of FIG. 21 is limited in that it cannot distinguish among tasks that are created with duplicate task handles. Such duplication only occurs when an application is allocating tasks dynamically. FIG. 23 presents an enhanced version of this method that overcomes this limitation. In this enhanced method, step 2100 includes further instrumentation of the embedded application. In addition to replacing the task switch hook function with a trigger support function, the task create hook function is also replaced with a profile support function that will be called each time a new task is created. This support function will cause the task handle of a newly created task to be captured as illustrated by added step 2110. The task handles for the created tasks are transmitted to host computer 1000 at step 2106. Because there are now task handles being captured at task creation and at each context switch, there must be a way to distinguish between the two modes of capture for purposes of correlating the power measurements with the task handles. One possible means of distinguishing is to provide an identifying header when the task handles are transferred to host computer 1000.

Figure 24:
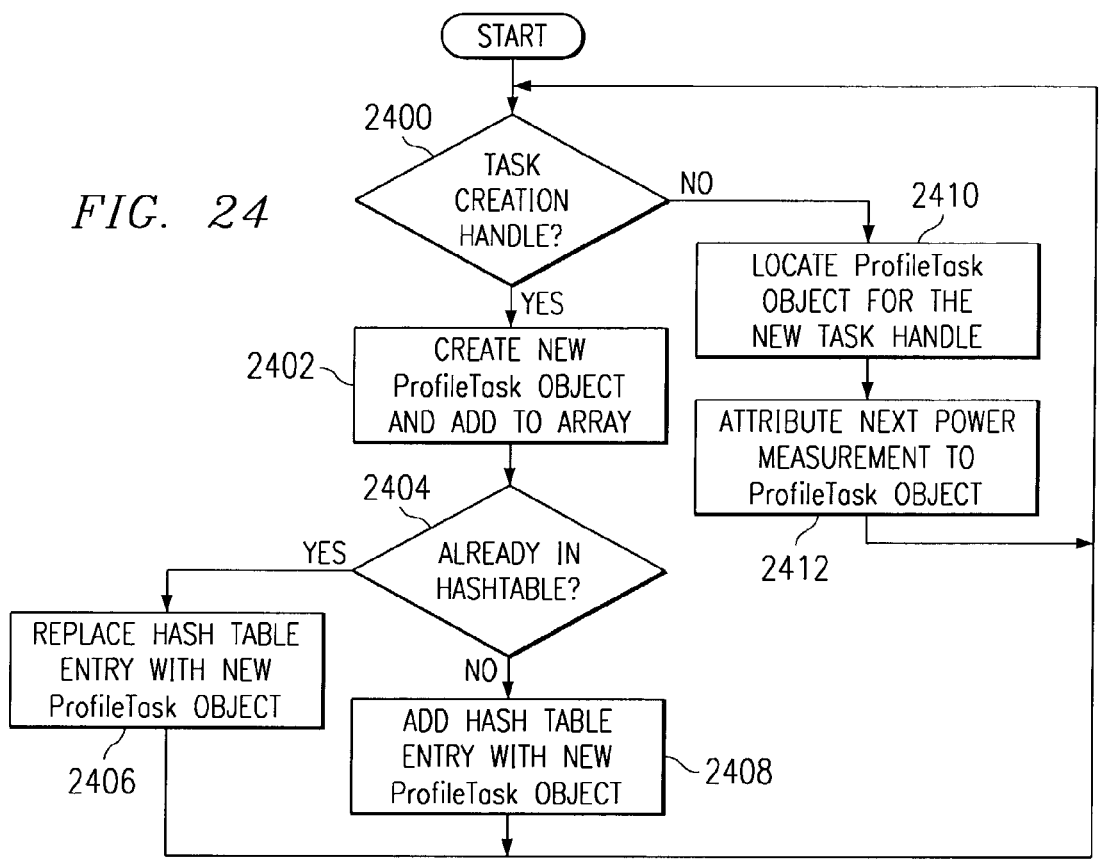

FIG. 24 illustrates a correlation method for power profiling software 1002 using the enhanced TR profiling method of FIG. 23. The steps of this method are executed for each task handle of the set of task handles. At step 2400, a check is made to determine if the next task handle was captured at task creation or at task execution. If it was captured at task creation, step 2402 is executed. A new ProfileTask object is created and added to an array that contains all ProfileTask objects created during the correlation process. At the end of the correlation process, this array will contain one ProfileTask object for each task executed in the embedded application. At step 2404, a check is made to determine if the task handle is already in the hash table. If it is, then a new dynamically allocated task was created during execution that has the same task handle as a previous dynamically allocated task. The hash table entry associated with the task handle is replaced with the new ProfileTask object at step 2406. If the task handle is not already in the hash table, then a new entry is created with the new ProfileTask object at step 2408. Processing of the set of task handles then continues at step 2400.

If the check at step 2400 determines that the task handle was not captured at task creation, then it was captured at task execution and step 2410 is executed. At step 2410, the ProfileTask object for the task handle is located in the hash table. And, at step 2412, the next power measurement in the set of power measurements is attributed to the task represented by that ProfileTask object. Processing of the set of task handles then continues at step 2400.

For example, consider an embedded application having tasks T1, T2, T3, T4, and T5 where T3 and T5 are dynamically allocated tasks. Assume that the task execution order is: T4, T3, T2, T1, T5, T4, T2, T1 and that T3 and T5 are given the same task handle, TH3, when they are created. The set of task handles and the set of power measurements will be THc4, THc2, THc1, TH4, THc3, TH3, TH2, TH1, THc3, TH3, TH4, TH2, TH1 and M1, M2, M3, M4, M5, M6, M7, M8 respectively. THcx indicates a task handle captured when the associated task Tx is created and THx indicates a task handle captured when the associated task Tx is executed.

Figure 25:
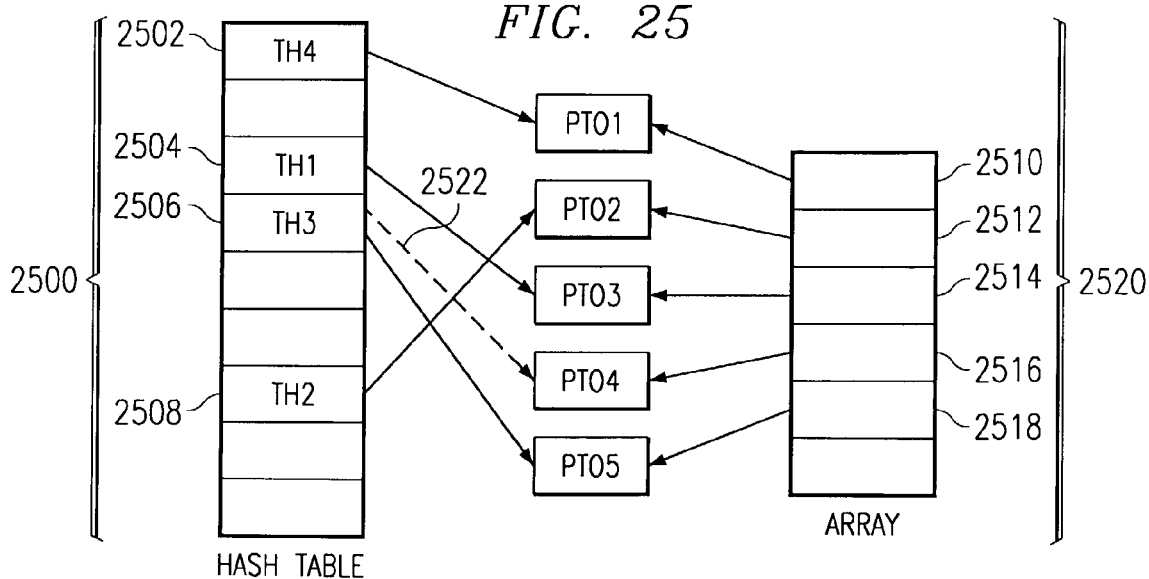
FIG. 25 illustrates the data structures created by a power profiling method.

FIG. 25 illustrates the state of the hash table and the array after the correlation method has been applied. At step 2400, THc4 is recognized as being a task handle captured when T4 was created. A new ProfileTask object, PTO1, is created and added to array 2520 as entry 2510 at step 2402. At step 2404, THc4 is found not to be in hash table 2500 so a new entry, 2502, is created for it. Note that this entry points to PTO1. THc2 and THc1 are then processed in turn in the same manner as THc4, with new ProfileTask objects, PTO2 and PTO3, respectively, being created for each and added to array 2520 as entries 2512 and 2514, respectively. Each is found not to be in hash table 2500 and new entries 2508 and 2504, respectively, are created for them. Resuming at step 2400, TH4 is found not be a task creation handle, so step 2410 is executed. Its ProfileTask object, PTO1 is located and power measurement M1 is attributed to the associated task. Resuming at step 2400, THc3 is found to be a task creation handle. A new ProfileTask object, PTO4, is created and added to array 2520 as entry 2516 and a new hash table entry, 2506, is created for it. As dotted arrow 2522 indicates, hash table entry 2506 currently points to PTO4. TH3 is then processed in a similar fashion to TH4, with power measurement M2 being attributed to the task associated with TH3. TH2 and TH1 are then processed with power measurements M3 and M4 attributed to the tasks associated with TH2 and TH1, respectively. Subsequently, at step 2400, THc3 is processed. It is determined to be a task creation handle and a new ProfileTask object, PTO5, is created and added to array 2520 as entry 2518 at step 2402. At step 2404, it is determined that a hash table entry, 2506, already exists for THc3. So, step 2406 is executed and hash table entry 2506 is updated with a pointer to PTO5. Processing resumes at step 2400, where TH3 is determined to be a task execution handle. At step 2510, its ProfileTask object, PTO5 is located and at step 2512, power measurement M5 is attributed to the associated task. TH4, TH2, and TH1 are subsequently processed, with each being found to be a task execution handle and power measurements M6, M7, and M8 being appropriately and respectively attributed to the associated tasks.

Task-level Non-real-time Profiling

Task-level non-real-time profiling (TNR) permits measurement of power consumption for all tasks, whether statically or dynamically allocated, that are executed in an embedded application. The primary difference between TNR profiling and TR profiling is that the target system is halted at each task context switch and the power consumption display is updated. FIG. 26 presents a flowgraph of a method for task-level non-real-time power profiling of an embedded application. At step 2600, the embedded application is instrumented to permit power profiling of all tasks that will be executed when the application is run. In an embodiment such as that of FIGS. 1A-1C, this instrumentation consists of linking in profiling support code tailored to target hardware 1018 and trigger 1014 be used on host computer 1000, downloading the application to target hardware 1018, and selecting the TNR profiling mode in power profiling software 1002. Power profiling software 1002 replaces the current address of the task switch hook function provided by the operating system of the embedded application with the address of the trigger function _TSPP_switchfxn_XXX_tnr. This will cause the trigger function to be called each time there is a task context switch while the embedded application is executing. Power profiling software 1002 also sets a breakpoint at the address specified by the symbol _TSPP_switchfxn_halt_XXX_tnr.

More specifically, in an embodiment, when replacing the task switch hook function, power profiling software 1002 performs the following steps:

1. Determines the address of the function that the application may have specified as the task switch hook function by reading the value of the variable referred to by the symbol _KNL_tswitchfxn.
2. If the user specified hook function is NULL, the value 0 is written into the variable referred to by the symbol _TSPP_switchfxn_user_hook. Otherwise, the address of the application hook function is written into the variable referred to by _TSPP_switchfxn_user_hook.
3. Writes the address of the trigger function _TSPP_switchfxn_XXX_tnr into the variable referred to by the symbol _KNL_tswitchfxn.

These steps preserve the address of any application specified task switch hook function so that it may be executed after the trigger function is executed.

After the embedded application is instrumented for TNR profiling, the user starts execution. During this execution, steps 2602-2608 of the method are performed at each context switch (step 2610). Any task context switch that occurs transfers control to the trigger function _TSPP_switchfxn_XXX_tnr. Each invocation of the trigger function will cause the following steps to occur:

1. The support routine clears trigger 1014, indicating the end of the previous measurement. This causes a power measurement to be captured on the power measurement device.
2. The trigger routine determines the task handle for the new task, which will begin executing when the context switch has completed. The trigger routine saves the task handle for the new task into the profiler support variable _TSPP_newtskhandle.
3. The trigger routine hits the breakpoint, which was set during instrumentation, at the address specified by the symbol _TSPP_switchfxn_halt_XXX_tnr. At this point execution is halted.
4. Power profiling software 1002 reads the task handle of the new task from the variable _TSPP_newtskhandle. If this is the first encounter of the task specified by _TSPP_newtskhandle, the information for this task to the internal structures maintained for correlating power measurements to tasks.
5. Power profiling software 1002 reads the power measurement from the power measurement device and attributes the power usage to the task that was executing before the task switch occurred using a correlation method. If peripheral status is also being gathered, the profiler will read the status of the peripherals from the target and update the task's peripheral usage information.
6. The display of profiling data is updated and execution of the embedded application is resumed.
7. The trigger routine restarts and sets trigger 1014, indicating the start of the next power measurement.
8. The trigger function calls the application's original hook function that was overridden if such function was present. The address of the original hook function is stored in the variable _TSPP_switchfxn_user_hook. If the value of this variable is 0, this indicates that there was no user hook function. Note that the user hook function is called after trigger 1014 is set. Therefore, the power consumed by the user hook function is measured and will be attributed to the new task.
9. Execution of the support routine returns back to the caller to continue execution of the application.

When the embedded application is halted at the _TSPP_switchfxn_halt_XXX_tnr breakpoint, power profiling software 1002 correlates the most recent power measurement to the task that was executing when the measurement was taken. FIG. 27 illustrates one method for correlating power measurements with the appropriate tasks. At step 2700, the current power measurement is attributed to the currently executing task by updating the entry for that task in the task handle data structure maintained by power profiling software 1002. In an embodiment, power profiling software 1002 knows which task is currently executing because it maintains a variable containing the task handle of the currently executed task. If the task handle received by power profiling software 1002 is a new one (step 2702), i.e., this is the first time the task will be executed, the task associated with the new task handle is identified and at step 2704, an entry for the new task handle is created in the task handle data structure. And, in an embodiment, the variable tracking the currently executing task is updated to contain the new task handle.

For example, if an application has tasks T1, T2, T3, and T4 whose execution order is: T4, T3, T2, T1, T4, T3, T2, T1, the task handles and power measurements received by host computer 1000 during execution of the application will be TH4, TH3, TH2, TH1, TH4, TH3, TH2, TH1 and M1, M2, M3, M4, M5, M6, M7, M8, respectively. When the method is applied at the first breakpoint in the first context switch, an entry for TH4 will be created in the task handle data structure as this is the first execution of T4. No power measurement will be attributed as no task has yet been executed. At the next context switch, power measurement M1 is attributed to T4 and an entry for TH3 is created in the task handle data structure. At the next context switch, M2 is attributed to T3 and an entry for TH2 is created in the task handle data structure, etc. Note that TH1 is the task handle for T1, TH2 is the task handle for TH2, etc.

FIG. 28 presents a flowgraph of an implementation of the above method. In this implementation, power profiling software 1002 maintains a hash table of pointers to ProfileTask objects that are created for each new task handle. The keys to this hash table are based on the task handles. To determine if a received task handle is a new one (step 2800), the hash table is checked to see if this particular task handle has already been encountered. If it has not, a new ProfileTask object is created (step 2802). The task associated with the task handle is identified by looking it up in the symbol table created when the embedded application was created and the task name is stored in the ProfileTask object. A new entry in the hash table is added with the new ProfileTask object at step 2804. After processing the new task handle or if no new task handle was received, step 2806 is executed. If a task is currently executing, the hash table entry of the ProfileTask object for that task is located (step 2808) and the current power measurement is attributed to the task by storing it in the ProfileTask object.

Figure 29:
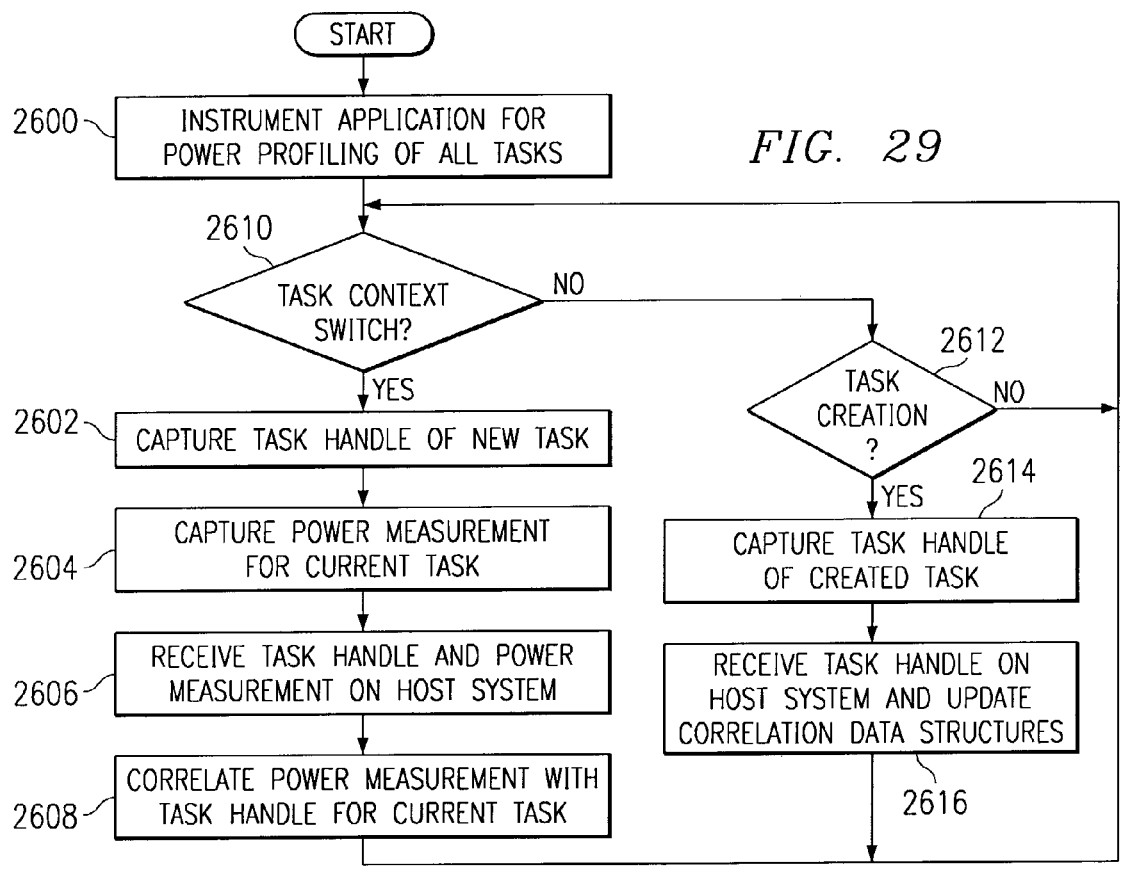

The method of FIG. 26 is limited in that it does not distinguish among tasks that are created with duplicate task handles. Such duplication only occurs when an application is allocating tasks dynamically. FIG. 29 presents an enhanced version of the method that overcomes this limitation. In this method, step 2600 includes further instrumentation of the embedded application. In addition to replacing the task switch hook function with a trigger support function, the task create hook function is also replaced with a task creation support function that is called each time a new task is created and a breakpoint is set in this support function. This support function will cause the task handle of a newly created task to be captured and received by host computer 1000 each time this breakpoint is hit during execution of the embedded application as illustrated by added steps 2612-2616. The task handles for the created tasks are received by host computer 1000 at step 2614 and used to update the task handle data structure. Because there are now task handles being captured at task creation and at each context switch, there must be a way to distinguish between the two modes of capture for purposes of correlating the power measurements with the task handles. One possible means of distinguishing is to provide an identifying header when the task handles are transferred to host computer 1000.

Figure 30:
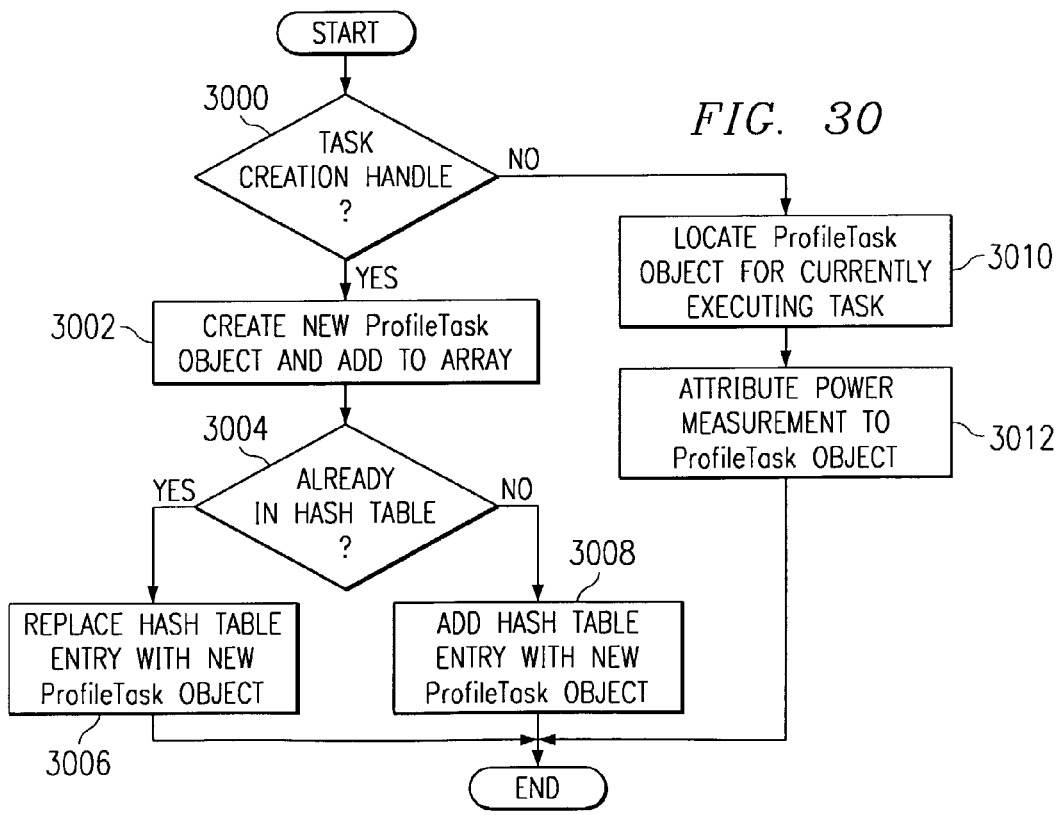

FIG. 30 illustrates a correlation method for power profiling software 1002 using the enhanced TNR profiling method of FIG. 29. The steps of this method are executed for each time the breakpoints in the two profile support functions are detected. At step 3000, a check is made to determine if the next task handle was captured at task creation or at task execution. If it was captured at task creation, step 3002 is executed. A new ProfileTask object is created and added to an array that contains all ProfileTask objects created during execution of the embedded application. When execution is complete, this array will contain one ProfileTask object for each task executed in the embedded application. At step 3004, a check is made to determine if the task handle is already in the hash table. If it is, then a new dynamically allocated task was created during execution that has the same task handle as a previous dynamically allocated task. The hash table entry associated with the task handle is replaced with the new ProfileTask object at step 3006. If the task handle is not already in the hash table, then a new entry is created with the new ProfileTask object at step 3008.

If the check at step 3000 determines that the task handle was not captured at task creation, then it was captured at task execution and step 3010 is executed. The ProfileTask object for the task handle of the currently executing task is located in the hash table. And, at step 3012, the current power measurement is attributed to that task by updating the ProfileTask object.

For example, consider an embedded application having tasks T1, T2, T3, T4, and T5 where T3 and T5 are dynamically allocated tasks. Assume that the task execution order is: T4, T3, T2, T1, T5, T4, T2, T1 and that T3 and T5 are given the same task handle, TH3, when they are created. The task handles and power measurements received by host computer 1000 will be THc4, THc2, THc1, TH4, THc3, TH3, TH2, TH1, THc3, TH3, TH4, TH2, TH1 and M1, M2, M3, M4, M5, M6, M7, M8 respectively. THcx indicates a task handle captured when the associated task Tx is created and THx indicates a task handle captured when the associated task Tx is executed.

FIG. 25 illustrates the state of the hash table and the array after the execution of the embedded application is complete. At step 3000, THc4 is recognized as being a task handle captured when T4 was created. A new ProfileTask object, PTO1, is created and added to array 2520 as entry 2510 at step 3002. At step 3004, Thc4 is found not to be in hash table 2500 so a new entry, 2502, is created for it. Note that this entry points to PTO1. THc2 and THc1 are then processed in turn in the same manner as THc4, with new ProfileTask objects, PTO2 and PTO3, respectively, being created for each and added to array 2520 as entries 2512 and 2514, respectively. Each is found not to be in hash table 2500 and new entries 2508 and 2504, respectively, are created for them. At the next context switch, at step 3000, TH4 is found not be a task creation handle, so step 3010 is executed. Its ProfileTask object, PTO1 is located and the current power measurement M1 is attributed to the associated task. Subsequently, T3 is created in the embedded application. At step 3000, THc3 is found to be a task creation handle. A new ProfileTask object, PTO4, is created and added to array 2520 as entry 2516 and a new hash table entry, 2506, is created for it. As dotted arrow 2522 indicates, hash table entry 2506 currently points to PTO4. At the next context switch, TH3 is processed in a similar fashion to TH4, with power measurement M2 being attributed to the task associated with TH3. TH2, and TH1 are subsequently processed with power measurements M3 and M4 attributed to the tasks associated with TH2 and TH1, respectively. Subsequently, at step 3000, THc3 is processed. It is determined to be a task creation handle and a new ProfileTask object, PTO5, is created and added to array 2520 as entry 2518 at step 3002. At step 3004, it is determined that a hash table entry, 2506, already exists for THc3. So, step 3006 is executed and hash table entry 2506 is updated with a pointer to PTO5. At the next context switch, at step 3000, T3 is determined to be a task execution handle. At step 2510, its ProfileTask object, PTO5, is located and at step 3012, the current power measurement M5 is attributed to T5. TH4, TH2, and TH1 are subsequently processed, with each being found to be a task execution handle and the current power measurements M6, M7, and M8 being appropriately and respectively attributed to the associated tasks.

Figure 19:
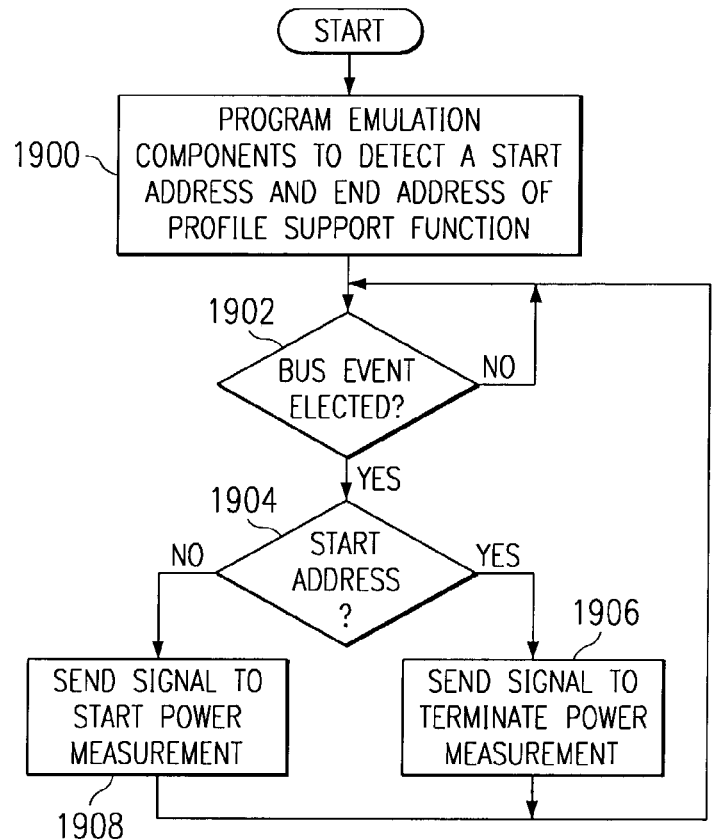

FIG. 19 presents a method to lessen the obtrusiveness of the SR, MNR, MR, TNR, and TR profiling modes previously described. When a DSP pin is used to trigger the power measurement device, as in the profiling system of FIG. 1B, code must be present in the profile support routines to set and clear the pin to trigger the power measurement device. The amount of code required depends on which pin is used. However, in the configurations of FIGS. 1A and 1C permitting the use of EMU0 and EMU1 for triggering the measurement device, no additional code in the profile support routines is required. Instead, power profiling software 1002 programs the required emulation components to monitor the address bus for a start address and an end address in the profile support routine inserted when the application is instrumented (step 1900). As shown in steps 1902, 1904, 1908, when the end address is detected, a trigger signal is sent on EMU0 to start power measurement. And, as illustrated in the sequence of steps 1902, 1904, 1906, when the start address is detected, a trigger signal is sent on EMU1 to terminate power measurement.

Figure 20:
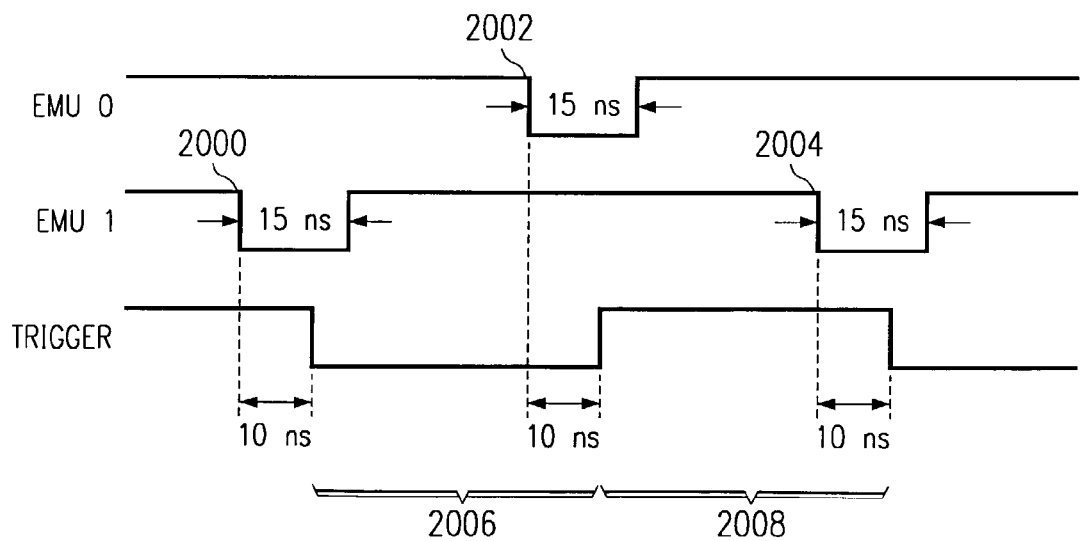
FIG. 20 illustrates the operation of the latch between the JTAG port and the emulation controller during multifunction non-real-time (MNR) and multifunction real-time (MR) power profiling.

In SR mode, latch 1006 operates as discussed previously for the unobtrusive method of single range power profiling. FIG. 20 illustrates the operation of latch 1006 during MNR or MR power profiling. When the instruction at the start address of the profile support routine is executed, EMU1 is pulsed at point 2000 to clear the trigger signal. The trigger signal remains low, as indicated by trigger width 2006, until the execution of the instruction at the end address of the profile support routine. Then, at end point 2002, EMU0 is pulsed. This 15 ns pulse causes the trigger signal to latch, sending a signal via trigger 1014 to the attached power measurement device. The trigger signal remains high, as indicated by trigger width 2008, until the next execution of the instruction at the start address of the profile support routine, i.e. when the next function to be profiled is executed.

In other embodiments of the above methods and systems for power profiling, the power measurement data collected is refined to permit more accurate profiling of power consumption, both for target systems that perform dynamic voltage scaling and those that do not. In power profiling systems such as those depicted in FIGS. 1A-1C, if power measurement devices 1012 and 1022 have only one input means, such as a channel on an oscilloscope, then the power measurement data captured is generally a current measurement. Since power P is actually calculated by the formula P=V*I where V is voltage and I is current, the voltage value must be provided some other way. As illustrated above in FIG. 9, one approach is to ask the user of the system to specify a value for V. This specified voltage value is then used as a constant in the ensuing power calculations.

However, it is unlikely that voltage is actually a constant while an application is executing. Typically, voltage will fluctuate between plus or minus 5-10%. And, if the target hardware supports dynamic voltage scaling, the application may deliberately cause voltage changes. If power measurement devices 1012 and 1022 have a second input means, both voltage and current values may be captured by providing both a current probe and a voltage probe. The power measurement data collected as the application is executing then comprises both actual voltage and actual current values, thus providing a more accurate measurement of power consumption.

While the above inventions have been described with reference to illustrative embodiments, these descriptions should not be construed in a limiting sense. Various other embodiments of the invention will be apparent to persons skilled in the art upon reference to this description. For example, the methods for measuring the power consumption of functions are clearly applicable to any analogous software unit in a high level programming language. The task level power profiling methods may be used in applications where portions of the application are dynamically linked and loaded. Also, the basic triggering scheme, the capturing of power and execution data, and the correlation methods may be readily extended to measure power consumption of applications executing on target hardware comprising multiple processors. Some example scenarios include: 1) a configuration in which a single power supply feeds multiple processors and the aggregate power measurement is taken from all the processors; 2) a configuration in which a single power supply feeds multiple processors where each processor is connected to a separate power measurement device; 3) a configuration with a multi-core chip in which each core on the chip has a separate power supply and the inter-processor interconnect is passive routing; and 4) a configuration with a multi-core chip in which each core on the chip has a separate power supply and the inter-processor interconnect comprises an active logic interconnect that is also separately powered. It is therefore contemplated that the appended claims will cover any such modifications of the embodiments as fall within the true scope and spirit of the invention.

What is claimed is:

1. A method for real-time power profiling of a target system comprising the steps of:
   instrumenting an embedded application to be executed on the target system to capture task execution data by
   replacing an address of a task switch hook function with an address of a trigger function such that the trigger function is called at each task context switch, and
   replacing an address of a task create hook function with an address of a task creation support function such that the task creation support function is called when each task is created;
   generating the task execution data as each task is executed on the target system and as each task is created on the target system, wherein the task execution data comprises a set of task handles wherein each task handle is a task creation handle or a task execution handle taken in the order each task was created or executed;

capturing power measurement data as each task is executed on the target system, wherein the power measurement data comprises a set of power measurements in the order each power measurement was taken wherein each power measurement in the set corresponds to an execution period of an executed task;

receiving the task execution data on a host system as the task execution data is generated without halting the embedded application; and correlating the task execution data with the power measurement data to determine a power consumption for each task, wherein the step of correlating comprises:

for each task handle in turn of the set of task handles
if the task handle is a task creation handle then
    a. creating a Profile Task object;
    b. adding the Profile Task object to an array of Profile Task objects; and
    c. if a hash table has an entry for a task associated with the task handle then
        c1. replacing the entry with the Profile Task object
    else
        c2. adding an entry to the hash table for the task associated with the task handle and placing the Profile Task object in the entry; and if the task handle is a task execution handle then
    a. locating a Profile Task object within the array of Profile Task objects for the task associated with the task handle using the hash table; and
    b. attributing a next power measurement of the set of power measurements to the task associated with the Profile Task object.

2. The method of claim 1 wherein each power measurement comprises measuring a voltage value and measuring a current value.

3. A method for power profiling of a target system comprising the steps of:

instrumenting an embedded application to be executed on the target system to capture task execution data by replacing an address of a task switch hook function with an address of a trigger function such that the trigger function is called at each task context switch, and replacing an address of a task create hook function with an address of a task creation support function such that the task creation support function is called when each task is created;

generating the task execution data as each task is executed on the target system and as each task is created on the target system, wherein the task execution data further comprises wherein the task execution data comprises a task creation handle or a task execution handle;

capturing power measurement data as each task is executed on the target system, wherein the power measurement data comprises a power measurement corresponding to an execution period of the executed task;

receiving the task execution data on a host system as the task execution data is generated; and correlating the task execution data with the power measurement data to determine a power consumption for each task, wherein the step of correlating comprises:

if the task execution data is a task creation handle then
    a. creating a Profile Task object;
    b. adding the Profile Task object to an array of Profile Task objects; and
    c. if a hash table has an entry for a task associated with the task creation handle then
        c1. replacing the entry with the Profile Task object
    else
        c2. adding an entry to the hash table for the task associated with the task creation handle and placing the Profile Task object in the entry; and if the task execution data is a task execution handle then
    a. locating a Profile Task object within the array of Profile Task objects for the task associated with the task handle using the hash table; and
    b. attributing a next power measurement of the set of power measurements to the task associated with the Profile Task object.

4. The method of claim 3 wherein the power measurement comprises measuring a voltage value and measuring a current value.

* * * * *